United States Patent
Hawkins et al.

(10) Patent No.: US 12,047,281 B2
(45) Date of Patent: Jul. 23, 2024

(54) SCALABLE NETWORK FUNCTION VIRTUALIZATION SERVICE

(71) Applicant: Amazon Technologies, Inc., Seattle, WA (US)

(72) Inventors: Reuben Alexander Hawkins, Seattle, WA (US); Nicholas Gene Kalteux, Seattle, WA (US); Stewart Allen, Seattle, WA (US); Harshit Vijayvargia, Seattle, WA (US); Christopher Thomas, Seattle, WA (US); Rajagopal Subramaniyan, Woodinville, WA (US); Gregory Skoczek, Seattle, WA (US); Rashid Michael Aga, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/459,902

(22) Filed: Aug. 27, 2021

(65) Prior Publication Data

US 2022/0052944 A1    Feb. 17, 2022

Related U.S. Application Data

(63) Continuation of application No. 16/129,632, filed on Sep. 12, 2018, now Pat. No. 11,108,687.

(51) Int. Cl.
*H04L 45/64* (2022.01)
*H04L 41/5041* (2022.01)
(Continued)

(52) U.S. Cl.
CPC .......... *H04L 45/38* (2013.01); *H04L 41/5041* (2013.01); *H04L 43/04* (2013.01);
(Continued)

(58) Field of Classification Search
CPC ..... H04L 45/38; H04L 41/5041; H04L 43/04; H04L 45/64; H04L 45/7453;
(Continued)

(56) References Cited

U.S. PATENT DOCUMENTS 6,006,272 A    12/1999    Aravamudan et al.
6,567,510 B1    5/2003    Brugman et al.
(Continued)

FOREIGN PATENT DOCUMENTS

CN    101073058    11/2007
CN    102598591 A    7/2012
(Continued)

OTHER PUBLICATIONS

Open Networking Foundation, "OpenFlow Switch Specification, Version 1.3.0", Internet Citation, Jun. 25, 2012, pp. 1-106, Retrieved from the Internet: URL:https://www.opennetworking.org/images/stories/downloads/specification/openflow-spec-v1.3.0.pdf [retrieved on Feb. 22, 2013].

(Continued)

*Primary Examiner* — Lakeram Jangbahadur
(74) *Attorney, Agent, or Firm* — Robert C. Kowert; Kowert, Hood, Munyon, Rankin & Goetzel, P.C.

(57) ABSTRACT

A network function virtualization service includes an action implementation layer and an action decisions layer. On a flow of network traffic received at the service, the action implementation layer performs a packet processing action determined at the action decisions layer.

20 Claims, 14 Drawing Sheets

(51) Int. Cl.
*H04L 43/04* (2022.01)
*H04L 45/00* (2022.01)
*H04L 45/7453* (2022.01)
*H04L 47/10* (2022.01)
*H04L 47/125* (2022.01)
*H04L 69/22* (2022.01)

(52) U.S. Cl.
CPC .......... *H04L 45/64* (2013.01); *H04L 45/7453* (2013.01); *H04L 47/125* (2013.01); *H04L 47/13* (2013.01); *H04L 69/22* (2013.01)

(58) Field of Classification Search
CPC ....... H04L 47/125; H04L 47/13; H04L 69/22; H04L 41/0897; H04L 41/342; H04L 43/0817; H04L 43/20; H04L 67/104; H04L 67/1095; H04L 67/568; H04L 41/0803
See application file for complete search history.

(56) References Cited

U.S. PATENT DOCUMENTS

| | | | |
|---|---|---|---|
| 6,581,090 B1 | 6/2003 | Lindbo | |
| 6,601,084 B1 | 7/2003 | Bhaskaran et al. | |
| 6,831,917 B1 | 12/2004 | Cheriton | |
| 6,993,021 B1 | 1/2006 | Chuah et al. | |
| 7,075,933 B2 | 7/2006 | Aysan | |
| 7,099,319 B2 | 8/2006 | Boden | |
| 7,782,782 B1 | 8/2010 | Ferguson et al. | |
| 7,796,607 B2 | 9/2010 | Gerber et al. | |
| 7,865,586 B2 | 1/2011 | Cohn | |
| 7,894,430 B2 | 2/2011 | Maalouf et al. | |
| 7,948,889 B2 | 5/2011 | Lalonde et al. | |
| 7,987,506 B1 | 7/2011 | Khalid et al. | |
| 8,125,908 B2 | 2/2012 | Rothstein et al. | |
| 8,199,651 B1 | 6/2012 | Schrempp et al. | |
| 8,244,909 B1 | 8/2012 | Hanson et al. | |
| 8,331,371 B2 | 12/2012 | Judge et al. | |
| 8,358,658 B2 | 1/2013 | Flynn et al. | |
| 8,369,345 B1 | 2/2013 | Raghunathan et al. | |
| 8,478,896 B2 | 7/2013 | Ehlers | |
| 8,693,470 B1 | 4/2014 | Maxwell et al. | |
| 8,792,504 B1 | 7/2014 | Guichard et al. | |
| 8,873,556 B1 | 10/2014 | Zuk et al. | |
| 8,930,690 B2 | 1/2015 | Zuo | |
| 9,043,487 B2 | 5/2015 | Retana et al. | |
| 9,049,179 B2 | 6/2015 | Luna | |
| 9,210,068 B2 | 12/2015 | Cai et al. | |
| 9,674,285 B2 | 6/2017 | Detienne et al. | |
| 9,843,624 B1* | 12/2017 | Taaghol | H04L 41/0895 |
| 9,916,545 B1 | 3/2018 | de Kadt et al. | |
| 9,934,273 B1 | 4/2018 | MacCarthaigh | |
| 9,935,829 B1 | 4/2018 | Miller et al. | |
| 9,998,955 B1 | 6/2018 | MacCarthaigh | |
| 10,212,161 B1 | 2/2019 | Schaefer et al. | |
| 10,218,613 B2 | 2/2019 | Cohn | |
| 10,225,146 B2 | 3/2019 | Miller et al. | |
| 10,243,834 B1 | 3/2019 | Shekhar et al. | |
| 10,256,993 B2 | 4/2019 | Miller et al. | |
| 10,257,693 B1 | 4/2019 | Mehra | |
| 10,320,644 B1 | 6/2019 | Chen et al. | |
| 10,361,911 B2 | 7/2019 | Brandwine et al. | |
| 10,374,949 B2 | 8/2019 | Miller et al. | |
| 10,389,608 B2 | 8/2019 | Searle et al. | |
| 10,397,344 B2 | 8/2019 | Akers et al. | |
| 10,419,287 B2 | 9/2019 | Miller et al. | |
| 10,484,297 B1 | 11/2019 | McClenahan | |
| 10,498,693 B1 | 12/2019 | Strauss et al. | |
| 10,530,657 B2 | 1/2020 | Brandwine et al. | |
| 10,574,534 B2 | 2/2020 | Brandwine et al. | |
| 10,593,009 B1 | 3/2020 | Surani et al. | |
| 10,601,909 B2 | 3/2020 | Brandwine et al. | |
| 10,644,933 B2 | 5/2020 | Cohn et al. | |
| 10,728,089 B2 | 7/2020 | Brandwine et al. | |
| 10,742,446 B2 | 8/2020 | Tillotson et al. | |
| 10,749,936 B1 | 8/2020 | Cohn et al. | |
| 10,785,146 B2 | 9/2020 | Tillotson et al. | |
| 10,797,989 B2 | 10/2020 | Tillotson et al. | |
| 10,834,044 B2 | 11/2020 | Tillotson et al. | |
| 10,846,108 B1 | 11/2020 | Chung | |
| 10,868,715 B2 | 12/2020 | Brandwine et al. | |
| 10,897,417 B2 | 1/2021 | Tillotson et al. | |
| 10,917,322 B2 | 2/2021 | Russell | |
| 10,952,586 B2 | 3/2021 | Cohn et al. | |
| 11,108,687 B1 | 8/2021 | Hawkins et al. | |
| 11,606,300 B2 | 3/2023 | MacCarthaigh | |
| 2002/0184388 A1 | 12/2002 | Yaseen et al. | |
| 2004/0268147 A1 | 12/2004 | Wiederin et al. | |
| 2005/0025069 A1 | 2/2005 | Aysan | |
| 2005/0193103 A1 | 9/2005 | Drabik | |
| 2006/0251088 A1 | 11/2006 | Thubert et al. | |
| 2007/0115990 A1 | 5/2007 | Asati et al. | |
| 2007/0239987 A1 | 10/2007 | Hoole et al. | |
| 2008/0005441 A1 | 1/2008 | Droux et al. | |
| 2008/0025218 A1 | 1/2008 | Liu | |
| 2008/0034200 A1 | 2/2008 | Polcha et al. | |
| 2008/0225875 A1 | 9/2008 | Wray et al. | |
| 2008/0228932 A1 | 9/2008 | Monette et al. | |
| 2009/0103430 A1 | 4/2009 | Wang | |
| 2009/0248846 A1 | 10/2009 | Cohn | |
| 2009/0288084 A1 | 11/2009 | Astete et al. | |
| 2010/0074256 A1 | 3/2010 | Seok et al. | |
| 2010/0094990 A1 | 4/2010 | Ben-Yehuda et al. | |
| 2010/0260196 A1 | 10/2010 | Holness et al. | |
| 2010/0262977 A1 | 10/2010 | Havemose | |
| 2010/0281181 A1 | 11/2010 | Johnson et al. | |
| 2011/0022694 A1 | 1/2011 | Dalal et al. | |
| 2011/0075667 A1 | 3/2011 | Li et al. | |
| 2011/0122880 A1 | 5/2011 | Saito et al. | |
| 2011/0149964 A1 | 6/2011 | Judge et al. | |
| 2011/0289118 A1 | 11/2011 | Chen et al. | |
| 2012/0011278 A1 | 1/2012 | Smith, Jr. et al. | |
| 2012/0057460 A1 | 3/2012 | Hussain et al. | |
| 2012/0099602 A1 | 4/2012 | Nagapudi et al. | |
| 2013/0346585 A1 | 12/2013 | Ueno | |
| 2014/0052836 A1 | 2/2014 | Nguyen et al. | |
| 2014/0115584 A1* | 4/2014 | Mudigonda | H04L 67/131 718/1 |
| 2014/0119374 A1 | 5/2014 | Balasubramanian et al. | |
| 2014/0169168 A1 | 6/2014 | Jalan et al. | |
| 2014/0241173 A1 | 8/2014 | Knight | |
| 2014/0314097 A1 | 10/2014 | Saltsidis | |
| 2015/0039674 A1 | 2/2015 | Agarwal et al. | |
| 2015/0063360 A1 | 3/2015 | Thakkar et al. | |
| 2015/0063364 A1 | 3/2015 | Thakkar et al. | |
| 2015/0134626 A1 | 5/2015 | Theimer | |
| 2015/0195178 A1 | 7/2015 | Bhattacharya et al. | |
| 2015/0244643 A1* | 8/2015 | Kinoshita | H04L 41/0896 709/226 |
| 2015/0263899 A1* | 9/2015 | Tubaltsev | H04L 45/02 370/254 |
| 2015/0263946 A1 | 9/2015 | Tubaltsev et al. | |
| 2015/0281081 A1 | 10/2015 | Rajahalme | |
| 2015/0281125 A1 | 10/2015 | Koponen et al. | |
| 2015/0382184 A1 | 12/2015 | Takazoe | |
| 2016/0070587 A1 | 3/2016 | Saladi et al. | |
| 2016/0094668 A1 | 3/2016 | Chang et al. | |
| 2016/0173600 A1 | 6/2016 | Galles et al. | |
| 2016/0259659 A1 | 9/2016 | Tang | |
| 2016/0277440 A1 | 9/2016 | Thubert et al. | |
| 2016/0285753 A1 | 9/2016 | Guleria | |
| 2016/0344798 A1 | 11/2016 | Kapila | |
| 2016/0352865 A1* | 12/2016 | Gupta | H04L 43/20 |
| 2017/0180234 A1 | 6/2017 | Agrawal et al. | |
| 2017/0180317 A1 | 6/2017 | de Alvarenga Bastos | |
| 2017/0373936 A1 | 12/2017 | Hooda et al. | |
| 2018/0278637 A1 | 9/2018 | Kuperman et al. | |
| 2018/0324080 A1 | 11/2018 | Mei et al. | |
| 2019/0132345 A1 | 5/2019 | Cha et al. | |
| 2019/0158396 A1* | 5/2019 | Yu | H04L 61/5007 |
| 2019/0335002 A1 | 10/2019 | Bogineni et al. | |
| 2020/0065130 A1 | 2/2020 | He et al. | |

(56) References Cited

U.S. PATENT DOCUMENTS

| | | | |
|---|---|---|---|
| 2020/0076909 A1 | 3/2020 | Kuperman et al. |
| 2020/0252937 A1 | 8/2020 | Nishio |
| 2021/0058364 A1 | 2/2021 | Tillotson et al. |

FOREIGN PATENT DOCUMENTS

| | | |
|---|---|---|
| CN | 104253865 | 12/2014 |
| CN | 104270296 | 1/2015 |
| CN | 104769896 | 7/2015 |
| CN | 105706086 | 6/2016 |
| EP | 1298853 A1 | 4/2003 |
| EP | 1713231 A1 | 10/2006 |
| EP | 3340064 A1 | 6/2018 |
| FR | 3059796 A1 | 6/2018 |
| WO | 02075554 | 9/2002 |
| WO | 2008110955 | 9/2008 |

OTHER PUBLICATIONS

Masahiro Satou, et al., "Server Side Networking for Cloud Data Centers", 2012 IEEE 1st International Conference on Cloud Networking (CLOUDNET), Nov. 28, 2012, pp. 17-22.

Kapil Bakshi, "Considerations for Software Defined Networking (SDN): Approaches and Use Cases", Aerospace Conference, 2013 IEEE, Mar. 2, 2013, pp. 1-9.

"A Brief Primer on Anycast", Matthew Prince, Oct. 21, 2011, pp. 1-4.

"Amazon Elastic Compute Cloud", User Guide for Linux, API Version, Jun. 15, 2014, pp. 1-684.

Amazon Web Services, "Shuffle Sharding: massive and magical fault isolation", http://www.awsarchitectureblog.com/2014/04/shuffle-sharding.html, Sep. 17, 2014, pp. 1-6.

Costin Raiciu, et al."Improving Datacenter Performance and Robustness with Multipath TCP" SIGCOMM'11, Aug. 15-19, 2011, pp. 1-12.

Albert Greenberg, et al "VL2: A Scalable and Flexible Data Center Network" Communications of the ACM, vol. 54, No. 3, Mar. 2011, pp. 1-10.

Chuanxiong Guo, et al "BCube: A High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

U.S. Appl. No. 14/565,164, filed Dec. 9, 2014, Tobias Lars-Olov Holgers, et al.

U.S. Appl. No. 14/526,410, filed Oct. 28, 2014, Eric Jason Brandwine.

U.S. Appl. No. 14/736,165, filed Jun. 10, 2015, Colm MacCarthaigh.

U.S. Appl. No. 14/736,167, filed Jun. 10, 2015, Colm MacCarthaigh.

U.S. Appl. No. 14/736,172, filed Jun. 10, 2015, Colm MacCarthaigh.

U.S. Appl. No. 18/182,299, filed Mar. 10, 2023, Colm MacCarthaigh.

Office Action from Chinese Patent Application No. 201980060476.5, mailed Apr. 17, 2024, pp. 1-14 (includes English translation).

\* cited by examiner

SCALABLE NETWORK FUNCTION VIRTUALIZATION SERVICE

BACKGROUND

This application is a continuation of U.S. patent application Ser. No. 16/129,632, filed Sep. 12, 2018, which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

As demand for virtualization-based services at provider networks has grown, more and more networking and inter-connectivity-related features may have to be added to meet the requirements of applications being implemented using the services. Many such features may require network packet address manipulation in one form or another, e.g., at level 3 or level 4 of the open systems interconnect stack. Some clients of virtualized computing services may wish to employ customized packet processing for application traffic flowing between specific sets of endpoints. Using ad-hoc solutions for all the different types of packet transformation requirements may not scale in large provider networks at which the traffic associated with hundreds of thousands of virtual or physical machines may be processed concurrently.

Figure 1:
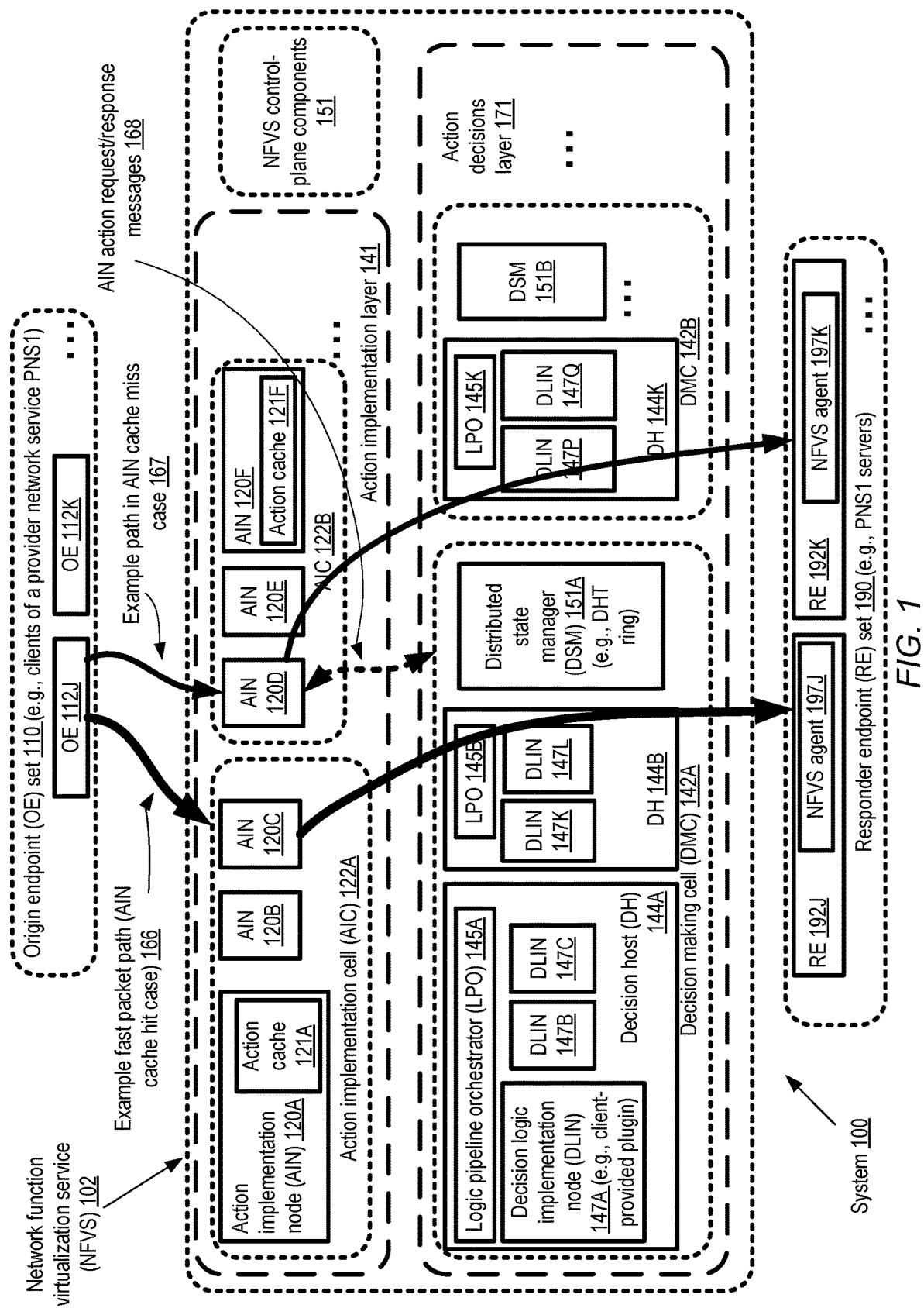
FIG. 1 illustrates an example system environment in which a multi-layered network function virtualization service (NFVS) may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing a scalable multi-layer service for network function virtualization are described. Using the described techniques, in various embodiments clients of such a service may be able to deploy various combinations a diverse collection of customized packet processing actions suited for their applications, without for example having to be concerned about infrastructure management tasks such as scaling up the resources needed, managing failure events at resources being used for packet processing, and the like.

According to some embodiments, the network function virtualization service (NFVS) may comprise at least two logical layers: an action implementation layer, and an action decision making layer. The action implementation layer may comprise a plurality of action implementation nodes (AINs) in various embodiments. Upon receiving a given network packet from an endpoint associated with an application to which an action implementation node is assigned, in some embodiments the action implementation node may perform a cache look up (e.g., using some combination of header elements of the packet as the key) to determine the specific packet processing action to be performed, and perform the action if an entry for the action is found in the cache. If an entry indicating the action is not found in the cache, a query for the action may be transmitted to the action decision making layer in various embodiments. At the action decision making layer, in various embodiments a pipeline comprising one or more decision logic implementation nodes (DLINs) may be used to determine the packet processing action to be implemented for the received packet (and, in at least some cases, for other packets associated with the application that are to be processed similarly). The specific sequence of DLINs to be used for a particular application may be indicated by a client of the NFVS, e.g., by supplying a pipeline descriptor formatted in a markup or scripting language via a programmatic interface. State information pertaining to the group of packets for which the action is determined may be stored, for example using a distributed hash table or similar state manager, at the action decision making layer in various embodiments. An indication of the action identified at the decision making layer may be provided to the action implementation node, where a corresponding entry representing the action may be stored in the local cache, and the action may be implemented. As a result of the action, in various embodiments one or more packets corresponding to or derived from the received packet may be transmitted to one or more destinations associated with the application. In various embodiments the action decision making layer may also be referred to as the action decisions layer.

Clients of the network function virtualization service (NFVS) may, for example, submit decision making logic (e.g., executable programs, scripts etc., which may be referred to as "plugins") that may be deployed at the nodes of one or more of the layers of the service, or indicate external programs/sources that are to be used for decision making logic implementation and/or action implementation in various embodiments. The NFVS may transparently provide the computing, storage and networking infrastructure at which the decision making logic and the packet processing actions are performed in various embodiments, thus enabling clients to focus on the logic of their networking applications rather than on managing the resources used for the applications. For example, in various embodiments, resources of one or more of the layers of the NFVS may be organized as easily replicable cells, so that additional packet processing capacity can be added on (or removed) rapidly as the needs of the clients' applications change over time. In one embodiment, for example, a cell of the decision making layer (which may be referred to as a decision making cell) may comprise a pipeline with at least one decision logic implementation node, at least one logic pipeline orchestrator responsible for managing the workflow of the pipeline, and a state manager comprising a distributed hash table. Logic pipeline orchestrators may also be referred to as logic path orchestrators in various embodiments. In at least some embodiments, a cell of the action implementation layer may comprise some number of action implementation nodes. In another embodiment, a given replicable cell of the NFVS may comprise some number of nodes of both the action implementation layer and the decision making layer, as well as a state manager. Cells of the NFVS may in effect represent programmable easy-to-configure units of packet processing capacity that can be scaled up or down as needed in various embodiments, with clients being able to control the programmable aspects (e.g., by providing or selecting decision making logic for the decision making layer, and/or implementation logic for the action implementation layer). As such, in various embodiments, the service may allow networking-related functions (at least at the packet processing level) to be virtualized from the perspective of the clients, eliminating decision making regarding the physical resources being used from the client's responsibilities. In various embodiments, the decision making logic and/or the actions supplied by clients of the NFVS may be validated thoroughly before deployment, e.g., to ensure that security and other acceptance criteria are met.

As one skilled in the art will appreciate in light of this disclosure, certain embodiments may be capable of achieving various advantages, including some or all of the following: (a) enabling a wide variety of client-selected customized packet processing operations to be combined in flexible ways for networking applications, while reducing the overall computing, memory, storage and network infrastructures resources consumed for the applications by intelligent resource sharing techniques, (b) improving the overall responsiveness of applications that utilize the packet processing operations, e.g., by quickly adding packet processing resources as the application workload increases, and/or (c) enhancing the security of networking applications by validating the packet processing operations being performed for the applications.

According to some embodiments, a system may comprise one or more computing devices of a network function virtualization service (NFVS). The computing devices may include instructions that upon execution on a processor cause the computing devices to identify, with respect to a first set of network endpoints associated with a first application, (a) one or more action implementation nodes (AINs) (e.g., from an action implementation layer of the NFVS) and (b) at least a first decision making cell (e.g., from an action decisions layer of the NFVS). Individual ones of the AINs and/or the DLINs may comprise software and/or hardware of one or more computing devices in various embodiments. The first decision making cell may, for example, comprise one or more logic pipeline orchestrators (LPOs), one or more decision logic implementation nodes (DLINs) running decision making logic, and a state manager used for storing persistent state information pertaining to the packets being managed for the first application. The state manager may, for example, be implemented using a distributed hash table comprising a plurality of state information storage nodes in one embodiment, with individual ones of the state information storage nodes being selected for a given group of packets based on hashing using a key derived from packet header elements.

In at least some embodiments, decision making logic may be obtained at the NFVS for the AINs and/or the DLINs, e.g., via programmatic requests submitted by the client on whose behalf the packet processing is to be performed, and/or from a catalog of logic made available to clients (from which the particular logic to be used in a given scenario may be selected by a client). For example, a first set of decision making logic may be deployed at one or more of the AINs designated for the first application, and a second set of decision making logic may be deployed to one or more of the DLINs in one embodiment.

When a packet is received at an AIN from one of the endpoints associated with the application, an attempt may be made (e.g., using the decision making logic that was deployed to the AIN) to look up an action for the packet in a cache of actions accessible from that AIN in various embodiments. If such an action is found, it may be implemented, resulting for example in one or more transformed packets being transmitted to one or more destinations from the AIN itself in some embodiments. If no action corresponding to the received packet is found, a request for a packet processing action may be transmitted to the decision making cell, e.g., to a particular logic pipeline orchestrator (LPO) of the cell in at least one embodiment. The LPO may manage a decision making workflow involving the DLIN(s), e.g., by causing one or more messages corresponding to the request to be transmitted along a path or pipeline which includes the first DLIN in some embodiments. Using at least the DLINs (e.g., with the help of client-provided decision making logic to at least one DLIN), the specific type of action to be performed for a group of one or more packets (including the packet that led to the action request) may be identified in various embodiments. The group of packets may be identified by a combination of one or more common header elements in some embodiments—e.g., the source and/or destination network addresses, the source and/or destination ports, etc., may be used to distinguish the group or "flow" of packets for which a common action is to be performed. At the state manager (e.g., at one or more nodes of a distributed hash table or a similar state repository), state information pertaining to the group of packets may be stored, e.g., using persistent storage devices in at least some embodiments. The state information may itself include a representation of the identified packet processing action in some embodiments. An indication of the packet processing action may also be provided to the requesting AIN in various embodiments, e.g., either from the state manager or from the logic pipeline orchestrator. The newly-identified action may be stored in the AIN's cache in various embodiments, so that it can be looked up quickly if/when the next packet of the group is received. One or more outbound packets corresponding to the packet that was received at the AIN may be transmitted (e.g., from the AIN or from the decision layer) to one or more destinations as part of the implementation of the identified action in various embodiments.

In some embodiments, instead of providing the actual plugins to be deployed for action decision making logic and/or action implementation, clients of the NFVS may provide indications of external resources that can be invoked to implement the decision logic or the packet processing actions. For example, instead of providing an executable plugin program "prog1" to be used at a decision logic implementation node, a network endpoint (such as a universal resource locator or URL similar to "https://<networkAddress>/programName") may be provided by a client, such that a web services request may be transmitted to the endpoint (e.g., by a logic pipeline orchestrator) to achieve the logical equivalent of invoking a local program. In some embodiments, one or more plugins and/or such external endpoints, when used for at least a portion of a decision pipeline, may be referred to collectively as decision sources. In at least some embodiments, at least some of the logic used to identify a specific action for a group of packets may be implemented at the state manager—e.g., one or more nodes of a distributed hash table being used as a state manager may be used to determine the action to be taken.

A variety of packet processing actions may be implemented at the NFVS in different embodiments. Some types of packet processing may involve generating, corresponding to a given received packet, one or more outbound packets whose headers are generated by modifying or copying portions of the headers of the received packets. Such packet processing operations may, for example, include load balancing operations, network address translation (NAT) operations, port address translation (PAT) operations, source address substitution operations, packet replication operations (such as multicast), anycast operations, and the like in different embodiments. In some embodiments, in addition to or instead of modifying header elements, data portions or body portions of the received packet may be transformed in the outbound packets—e.g., contents of the data payload of an encrypted packet received at an AIN may be extracted and/or decrypted, or other types of changes may be made to the data payload.

According to at least some embodiments, an NFVS may be implemented within, or accessed from, resources of a provider network or cloud computing environment. In one embodiment, for example, different subsets of resources of a provider network may be organized as isolated virtual networks (IVNs) on behalf of respective clients of the provider network, and considerable flexibility regarding network configuration within a given IVN may be provided to the client on whose behalf the IVN is set up. For example, a client may choose arbitrary ranges of Internet Protocol (IP) addresses as private addresses for the resources within the client's IVN (e.g., for resources whose addresses are by default not advertised outside the IVN). In at least some embodiments, one or more source or destination endpoints whose packets are processed using the NFVS may comprise resources within an IVN—that is, traffic originating and/or terminating in IVNs may be processed using the multi-layer packet processing techniques introduced above.

In at least some embodiments, the NFVS may be implemented using resources of a computing service within a provider network—e.g., at least some of the NFVS nodes, orchestrators, the state manager and the like at the different layers, etc., may be implemented using virtual machines or physical hosts of such a computing service. In one embodiment in which the NFVS is implemented using such provider network resources, at least some of the endpoints whose traffic is processed using the NFVS may lie within networks external to the provider network—e.g., in client networks, or in the public Internet.

Respective packet processing decisions and actions may be implemented for respective "flows" of network packets in different embodiments—e.g., where individual flows are distinguished from one another at least in part using some set of header elements of the packets. The particular combination of header elements (e.g., source IP address, initial destination IP address, source port, destination port, and the like) used for defining or distinguishing flows may differ in different embodiments. Packets transmitted in accordance with a variety of networking protocols may be processed in different embodiments at the NFVS—e.g., packets formatted and transmitted according to TCP (Transmission Control Protocol), UDP (User Datagram Protocol), and/or protocols that do not belong to the TCP/IP family of protocols may be processed.

As mentioned earlier, in some embodiments, a distributed hash table (DHT) may be used to implement at least a portion of a state manager for at least some cells of the NFVS. In one such embodiment, a given DHT may comprise a plurality of nodes arranged in a logical ring, in which individual ones of the nodes may be responsible for storing state information for packet flows within a respective portion of a key space defined using elements of various headers of the packets. In at least one embodiment in which a DHT ring is used for state management, state information pertaining to a particular flow (or a group of packets for which similar processing is to be performed) may be replicated at several different nodes of the DHT ring. For example, one node of the ring may be designated as a primary node for storing state information of the flow, while one or more other nodes may be designated as non-primary nodes at which the state information of the flow is also replicated in such an embodiment.

In at least some embodiments, resources at one or more layers of the NFVS may be configured in multi-tenant mode. For example, a given action implementation node, a given logic pipeline orchestrator, a given decision logic implementation node, and/or a given state manager may be designated for use for different clients of the NFVS, e.g. for respective applications of multiple clients. As a result of such resource sharing among multiple applications, the overall amount of computing, memory, storage and networking resources used for the combination of applications being supported may be reduced in various embodiments, e.g., compared to single-tenant-only solutions. In at least one embodiment, one or more resources being used for an application may be configured in single-tenant mode, e.g., in response to a programmatic request from a client.

A number of alternative approaches may be supported with regard to the implementation of AINs, LPOs, DLINs, and state managers in different embodiments. In some embodiments, one or more of these elements of the NFVS may be implemented using programs running within virtual machines running at virtualization hosts of a computing service. In other embodiments, one or more of these elements may be implemented as programs running within operating systems of non-virtualized (physical) machines. In one embodiment, at least some of the elements may be implemented using scripts—e.g. an executable script may be provided by a client for implementing a portion of a decision logic pipeline, using a script execution engine such as a JavaScript engine. In at least some embodiments, decision node logic may be implemented on remote hosts—e.g., a logic pipeline orchestrator running on a given host may invoke programs running at other hosts to implement the decision logic pipeline associated with a given flow.

In at least some embodiments in which a cell-based implementation of the NFVS is employed, additional cells may be automatically deployed as the packet processing workload associated with a given application (or with multiple applications considered collectively) changes over time. For example, resource utilization levels and/or other metrics may be collected from various nodes associated with a given application or a group of applications, and if the metrics meet some selected criteria, one or more new cells at the decision making layer and/or the action implementation layer may be instantiated in such embodiments. In at least one embodiment, in response to the analysis of such metrics, the resources within a given cell may be modified instead of or in addition to adding/removing cells—e.g., the number of AINs and/or DLINs of a given cell may be modified, or the number of nodes of a distributed hash table may be modified.

Example System Environment

FIG. 1 illustrates an example system environment in which a multi-layered network function virtualization service (NFVS) may be implemented, according to at least some embodiments. As shown, system 100 may comprise resources and artifacts organized into at least two layers of the network function virtualization service 102: an action implementation layer 141 and an action decisions layer 171. The depicted elements of the action implementation layer 141 and the action decisions layer 171 may be considered part of the data plane of the NFVS 102 in various embodiments, as they may be used collectively primarily for processing application data packets of various NFVS clients. In addition to the data plane, the NFVS 102 may comprise a set of control plane components 151, which may be used primarily for configuration and administration of the service in the depicted embodiment. For example, in various embodiments, clients of the NFVS may submit programmatic requests to the control plane 151 as discussed below, requesting that connectivity via the NFVS data plane be established between specified groups of endpoints for one or more applications.

The NFVS 102 may be used to process network traffic flowing in one or both directions between a variety of endpoint sets in different embodiments. In the embodiment shown in FIG. 1, network packets associated with one or more applications of one or more NFVS clients are assumed to be received at the action implementation layer 141 from endpoints of origin endpoint (OE) set 110, such as OE 112J or 112K. After the appropriate packet processing actions are performed with regard to a given received packet, one or more outbound packets may be transmitted from the NFVS 102 to endpoints at a traffic responder endpoint (RE) set 190, such as RE 192J or 192K. For example, in one embodiment, the OE set 110 may represent clients of a network-accessible service PNS1 being implemented using resources of a provider network, the RE set 190 may represent servers of the service PNS1, and the packet processing tasks being performed may include load balancing using one or more algorithms such as round robin load balancing, rejection based load balancing, connection count-based load balancing, or the like. Examples of other categories of packet processing are discussed below in further detail.

In the depicted embodiment, the action implementation layer 141 and the decisions layer 171 may each comprise a respective collection of cells. In various embodiments, an action implementation cell (AIC) 122 (such as AIC 122A or 122B) may be considered an easily replicable unit of packet processing capacity, while a decision making cell (DMC) 142 (such as DMC 142A or 142B) may be considered an easily replicable unit of decision making capacity with respect to identifying specific actions to be implemented for various groups or flows of packets. A given client application which requires packet processing to be performed for traffic flowing between a pair of endpoint sets may initially be assigned some number of AICs 122 and some number of DMCs in the depicted embodiment, with the specific numbers of AICs and DMCs being selected at the NFVS control plane based for example of estimates of the traffic volume to be processed for the application. Later, based for example on metrics collected from the nodes of the assigned AICs and DMCs, the numbers of AICs and/or DMCs may be dynamically increased or decreased, without interrupting the application's traffic in various embodiments.

In the depicted embodiment, an action implementation cell 122 may comprise one or more action implementation nodes (AINs) 120, such as AIN 120A, 120B, 120C, 120D, 120E or 120F, and at least one action cache 121, such as cache 121A or 121F. In some embodiments, individual ones of the AINs 120 may have respective action caches 121. A given action implementation node 120 may comprise software and/or hardware elements at one or more computing devices such as physical hosts in various embodiments. When a packet is received at a given AIN 120, an attempt may be made to look up a corresponding packet processing action in a locally accessible cache (such as cache 121A in the case of AIN 120A). A key comprising, for example, some combination of header element contents of the incoming packet and/or other characteristics of the incoming packet may be used to look up the action in the cache in some embodiments. If an action corresponding to the received packet is found in the cache 121, the action may be implemented at the AIN, and as a result, one or more outbound packets corresponding to the received packet may be transmitted to one or more destinations (e.g., one of the responder endpoints 192) in the depicted embodiment. This scenario, corresponding to an AIN cache hit, is represented by the pathway labeled 166 in FIG. 1. In at least some embodiments, individual actions may be identified for a group of packets to which the received packet belongs, where the group may be referred to as a "flow", and groups may be distinguished from other groups by some combination of packet header elements such as source and destination addresses. In various embodiments, the cache hit rate at the AINs may be expected to be quite high, and the most common scenario for packet processing may thus require no interactions with the action decisions layer 171. The path between an origin endpoint 112, an AIN 121 at which the cache hit occurs, and a responder endpoint 192 may represent a "fast path" for packet processing and transmission in the depicted embodiment. In at least some embodiments, action implementation logic such as one or more customized executable programs for performing the packet processing actions required for a given application whose traffic is to flow between a pair of endpoint sets may be supplied to the NFVS and deployed at resources designated for AINs 120.

If an action for a given received packet is not found in a cache 121, an AIN 120 may interact with a decision making cell (DMC) 142 at the action decisions layer 171 to determine how the packet should be processed. As indicated by element 168, one or more action request and response messages may be exchanged between the AIN and a DMC to identify the action to be performed. A given DMC 142, such as 142A or 142B may comprise one or more logic pipeline or path orchestrators (LPOs) 145 (e.g., LPO 145A, 145B or 145K), a pipeline of one or more decision logic implementation nodes (DLINs) 147 (such as 147A, 147B, 147C, 147K, 147L, 147P, or 147Q), and a distributed state manager (DSM) 151 (such as DSM 151A or 151B) in the depicted embodiment. In some embodiments, a DMC 142 may comprise one or more decision hosts (DHs) 144, such as DH 144A and 144B of DMC 142A, or DH 144K of DMC 142B. In such an embodiment, a given DH may include one or more LPOs 145 and one or more DLINs 147. In at least one embodiment, a given DMC 142 may also include one or more action caches.

When a request for an action to be identified for a given packet is received from an AIN 120 at a DMC 142, in some embodiments the LPO may attempt to determine whether an action for that packet was already generated earlier. If so, the action may be retrieved from an action repository or cache (not shown in FIG. 1) accessible from the DMC and returned to the requesting AIN 120 for implementation in some embodiments. The AIN 120 may receive a representation of the action, store it in its cache 121, and implement the action, resulting in one or more packets being transmitted to a destination as indicated in the cache miss path 167. In at least one embodiment, the packet processing action may be implemented at the decisions layer, instead of being delayed until the action is provided to the requesting AIN 120—e.g., one or more outbound packets corresponding to the received packet for which the action was requested may be sent from the action decisions layer itself to one or more destinations.

If an action corresponding to the packet received at the AIN 120 is not found in a repository or cache at the decisions layer 171, one or more decision logic implementation nodes (DLINs) 147 may be employed to determine the action to be performed in various embodiments. As discussed below in further detail, individual ones of the DLINs may perform respective pieces of the overall logic needed to determine the action for packets of the application whose traffic is to be processed, and a pipeline comprising different combinations of DLINs 147 of one or more DHs 144 may be used for different clients or applications in some embodiments. An LPO 145 may coordinate the decision making workflow, including the passage of the messages among the DLINs 147 required to determine the overall action to be taken in various embodiments. In at least one embodiment, decision making logic such as customized executable programs, scripts etc. to be run at various DLINs for an application may be provided by NFVS clients via control plane interactions, and deployed at the DHs of one or more DMCs.

The particular action implementation cell to which a packet is to be directed from an origin endpoint may be selected based at least in part on any of various factors in different embodiments, including for example flow hashing based on source/destination addresses/ports of the packet, one or more virtual network interfaces which may have been associated programmatically with the cell and the application for which packet processing is being performed, locality considerations (e.g., network proximity or physical proximity of the cell to the origin endpoint), shuffle-sharding parameters, and so on. In at least some embodiments, the AINs 120 may be stateless—e.g., any given AIN of a selected AIC may be selected to process a given packet. Similarly, in some embodiments, LPOs and/or DHs may be stateless. The particular DMC to which a request for an action is to be transmitted in the event of a cache miss at an AIN may be selected based on a number of factors similar to those used for selecting the AIC, while an LPO or DH to which a request for an action is sent from the AIN may be selected at random from among the LPOs/DHs of the DMC in some embodiments. DLINs may also be stateless in at least one embodiment. In other embodiments, at least some state information pertaining to the set of packets to be processed by a node may be stored at an AIN, an LPO, a DH or DLIN. In some embodiments, once a particular AIN has been selected for a particular group or flow of packets, that same AIN may be used for one or more other packets of the group or flow. Similarly, in some embodiments once a given set of components (LPOs, DLINs, etc.) has been identified at the decisions layer for a particular group or flow of packets, that group of components may also be used for any subsequent decision making operations for that group or flow.

State information corresponding to the flow or packet group to which the received packet belongs, including the identified action, may be stored or persisted at a distributed state manager (DSM) 151 associated with a DMC 142 at which the action is identified in some embodiments. A variety of state information elements in addition to the action, including for example information regarding the rate at which packets of the flow are received and processed, the most recent time at which a packet of the flow was processed, etc., may be persisted at the DSM 151 in various embodiments. In some embodiments, AINs may periodically or on demand transmit updated state information for a given flow to the appropriate DSMs. In at least one embodiment, a DSM 151 may comprise a plurality of nodes of a distributed hash table organized as a logical ring, with individual ones of the ring nodes being responsible for storing state information for a respective range or collection of key values associated with flows. In some embodiments, each node of the DHT may be implemented at a respective physical or virtual machine. In one embodiment, state information for a given flow may be replicated at several nodes of a DSM for higher availability and fault tolerance—e.g., one node may store a primary copy of the state information, while one or more non-primary copies may be stored at other nodes. In addition to or instead of distributed hash tables, other types of state repositories may be employed in some embodiments.

In at least one embodiment, a single replicable cell may comprise resources of both the action implementation layer 141 and the action decisions layer 171—e.g., one or more action implementation nodes 120, logic pipeline orchestrators 145, and/or distributed state managers 151 may be incorporated into a single multi-layer NFVS cell. In some embodiments, some cells may differ in their processing capacity from other cells at the same layer—e.g., a DMC categorized as a "large" DMC may comprise 9 DHs, while a DMC categorized as a "small" DMC may comprise 3 DHs. In at least some embodiments, at least some of the resources of the NFVS may be utilized in a multi-tenant mode—e.g., a given AIC or A given DMC may be designated for use for more than one application of more than one client. In one embodiment, a cell-based approach may not necessarily be employed at one or more layers of the NFVS—instead, for example, a pool of nodes and/or DSMs may be set up for each layer and the appropriate number of nodes/DSMs may be assigned to individual applications or clients from the pool(s).

As mentioned earlier, in at least some embodiments, an NFVS client may submit or select decision making logic such as executable programs, scripts or the like, and the NFVS may deploy the logic at appropriate execution platforms. Such customizable decision making logic may be referred to as "plugins" in at least some embodiments, as they may be deployed onto a common infrastructure using a standardized set of programmatic interfaces at the NFVS. In various embodiments in which clients supply or indicate the plugins, the NFVS control plane may validate the plugins, e.g., to ensure that the plugins do not violate security related and/or other acceptance criteria, before deploying the plugins and initiating packet processing using the plugins. In at least some embodiments, instead of supplying decision making logic to the NFVS, clients may provide pointers of remote sources (e.g., URLs at which programmatic requests can be directed by NFVS components such as LPOs) that can be used to perform the decision making tasks and/or the packet processing actions.

A wide variety of packet processing actions, associated with packets of any desired networking protocol (e.g., protocols of the TCP/IP family or other families), may be implemented using an architecture of the kind shown in FIG. 1. In different embodiments, for example, load balancing, network address translation, port address translation, source address substitution, packet replication such as multicast, anycast and other actions that involve packet header manipulation may be performed. In at least one embodiment, actions that involve extraction, analysis and/or modification of packet data payloads, such as encryption/decryption or the like, may also or instead be performed. The source and destination endpoints of the traffic being processed may in some embodiments be configured within isolated virtual networks set up on behalf of respective clients of a virtual computing service.

In at least some embodiments, one or more of the sources and/or destinations for the packets of the applications being implemented using the NFVS may include agents of the NFVS 102. For example, in the embodiment depicted in FIG. 1, responder endpoints 192J and 192K may have a respective associated NFVS agent 197J and 197K instantiated. Such agents, which may be configured or installed in some embodiments at the request of NFVS clients, may provide various types of feedback to the action decisions layer 171 and/or the action implementation layer 141. In one embodiment, for example, a respective agent 197 may be set up at several possible destinations of a load balancing application built using the NFVS (e.g., at servers among which requests directed to the NFVS are distributed in accordance with client-specified load balancing policies). After an action is determined for a particular received packet, a corresponding outbound packet (whose data portion or body may comprise the same contents as the received packet) may be transmitted to a load balancing destination such as endpoint 192K from the action implementation layer in one such embodiment. There, despite the selection of the endpoint by the NFVS action decisions layer, in some cases the outbound packet (and/or the network connection used for the outbound packet) may be rejected by the NFVS agent 197. Such a rejection may be based, for example, on a self-health analysis of the endpoint 192K, and/or on a custom rejection criterion indicated by the client on whose behalf the load balancing application was established using the NFVS. One client may, for example, send a programmatic request to the NFVS in some embodiments indicating that NFVS agents at the load balancing destinations are to reject a packet or connection if (a) the CPU utilization at the host at which the packet is received exceeds a threshold CPUT1 and (b) if the number of connections open at the host exceeds a threshold NCONN1, even if the host could handle the additional workload associated with being selected as the recipient of the packet or connection. The action decisions layer and/or the action implementation layer may then have to identify and implement a different action corresponding to the rejected packet/connection, e.g., resulting in a selection of a different recipient. Such a load balancing technique may be referred to as rejection-based load balancing in some embodiments. The use of such client-customized criteria at application endpoints may extend the customizability of the NFVS beyond the action decisions layer and the action implementation layer in various embodiments, enabling even more sophisticated types of packet processing (e.g., techniques that take dynamically varying conditions at traffic destinations and sources into account) to be performed. Note that in some embodiments, such NFVS agents may not be deployed or used for at least some applications.

Infrastructure Features and Client-Customizable Network Functions

Figure 2:
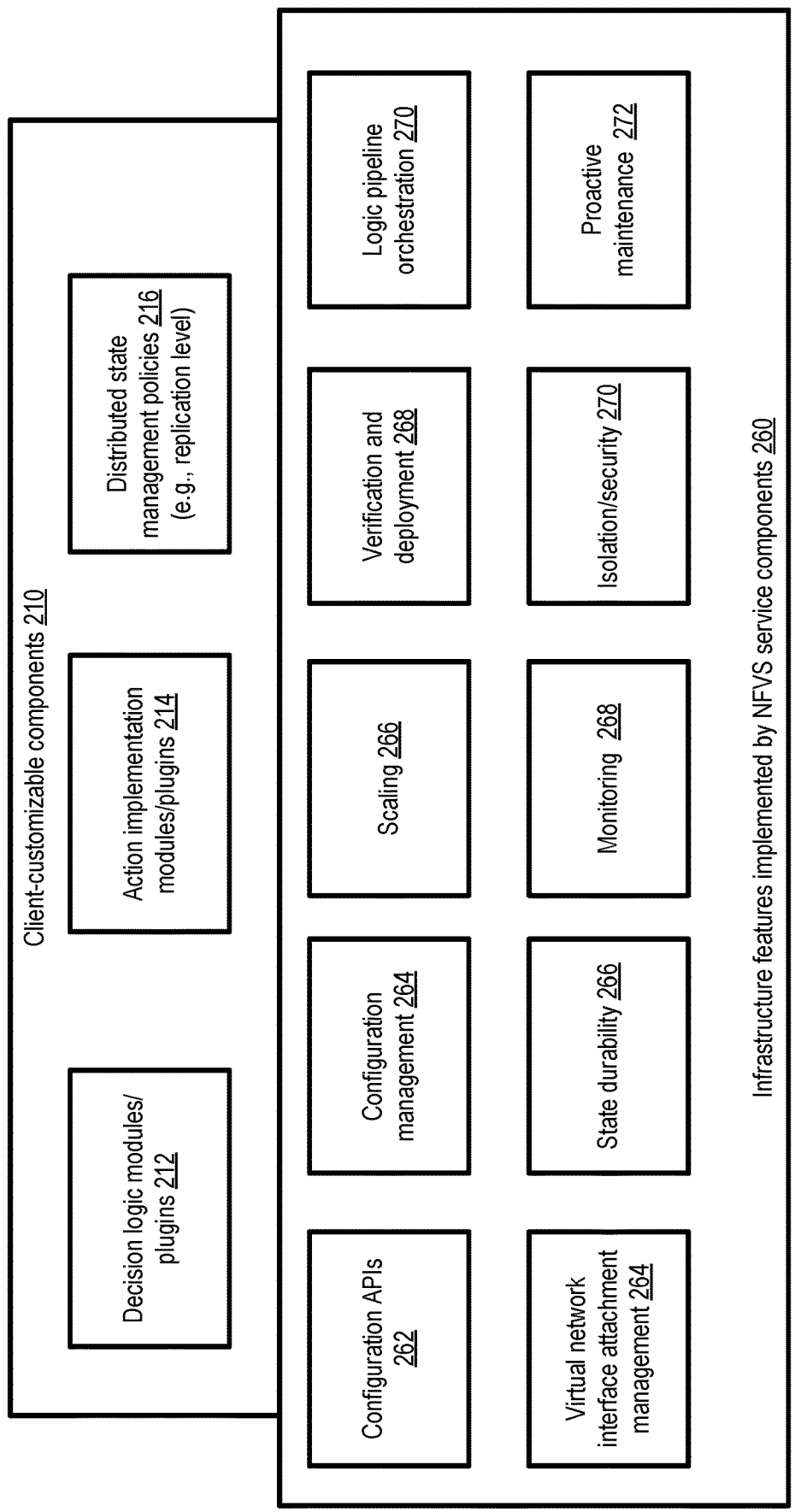
FIG. 2 illustrates an example overview of types of infrastructure features which may be supported at a network function virtualization service which enables clients to customize packet processing actions for various applications, according to at least some embodiments.

FIG. 2 illustrates an example overview of types of infrastructure features which may be supported at a network function virtualization service which enables clients to customize packet processing actions for various applications, according to at least some embodiments. As shown, a number of capabilities and features 260 may be implemented in a transparent manner by the NFVS in the depicted embodiment, while clients may provide or recommend custom versions of components 210 that are deployed on top of the infrastructure supported by the NFVS.

As part of the infrastructure, the NFVS may implement a set of configuration application programming interfaces (APIs) 262 in some embodiments, which may for example be usable by various clients to set up and modify their packet processing software/hardware stacks. The configuration APIS 262 may be used, for example, to indicate the approximate expected rate of packets to be processed, the targeted responsiveness of the packet processing nodes set up at the NFVS, the number of nodes at each layer, the expected uptime requirements, and so on. Based on the information provided via the APIs 262, the NFVS may identify a set of cells, nodes, DSMs and the like to be used for a given client or application in various embodiments.

Configuration management 264 may include the issuance of the appropriate low level commands or requests to set up the nodes for decision making and action implementation in various embodiments. Scaling 266 may include adding more physical and/or virtual platforms to a given application's set of allocated platforms as needed; as discussed earlier, in at least some embodiments, scaling may be implemented by adding or removing cells comprising groups of resources at the various NFVS layers, and/or by changing the amount of resources within a given cell or group of cells.

Verification and deployment 268 may comprise checking that received sets of decision making logic (such as executable programs/scripts to be run locally, or programs/scripts to be invoked over a network) meet various acceptability criteria of the NFVS, deploying the decision making logic to (or performing configuration changes to make remote decision making logic accessible via a network from) execution platforms if validation/verification succeeds in the depicted embodiment.

Logic pipeline orchestrators (LPOs) discussed earlier may be used in various embodiments to manage the overall decision logic pipelines—e.g., to ensure that the correct combination of decision logic implementation nodes (DLINs) are used in the correct sequence for packets of various flows and applications, as part of the orchestration feature 270 of the NFVS. In some embodiments, for example, a configuration file or manifest indicating the decision logic pipeline stages or elements may be used for orchestration. Note that in some embodiments, only a single DLIN may be needed for some types of packet processing decisions, in which case the pipeline may comprise a single node and may not require the LPO to coordinate the flow of messages among multiple DLINs.

In at least some embodiments, e.g., to help ensure the logical isolation of packets of various applications from one another, virtual machines (which may be used as endpoints and/or for implementing NFVS nodes and DSMs) and virtual network interfaces (VNIs) may be configured at the NFVS. A VNI may comprise a logical entity with a set of networking and security-related attributes that can be attached to (or detached from) a virtual machine programmatically in such embodiments. For example, at least one IP (Internet Protocol) address "IPaddr1" may be assigned to a given virtual network interface VNI1, and security rules restricting inbound and outbound traffic may be set for VNI1. When that VNI is programmatically attached to a given virtual machine VM1 launched at a host with a physical network interface card NIC1, network packets indicating IPaddr1 as their destination address (and complying with the security rules) may be received at VM1 via NIC1. In addition, outbound packets generated at VM1 may indicate IPaddr1 as their source address and may be physically transmitted towards their destinations via NIC1. If VNI1 is then programmatically detached from VM1 and attached to VM2 (which is executing at a different host with a different physical network interface card NIC2), the IPaddr1 traffic that was previously being received at CI1 may now be received at CI2, with the same security rules in place. Support for virtual network interfaces may considerably simplify several types of network configuration tasks, including the operation of various nodes of the NFVS in some embodiments. For example, a respective VNI with a unique IP address may be designated for receiving network packets of a given client application at the action implementation layer in some embodiments. The attaching and detaching of VNIs for various NFVS components may be handled as part of VNI attachment management feature 264 in various embodiments.

A framework for state durability 266, e.g., using a distributed hash table which can be used to store actions and state metadata for various network flows as discussed below in further detail, may be provided by the NFVS as one of its core functionalities in the depicted embodiment. The NFVS may also provide automated monitoring 268 as one of its default features in various embodiments—e.g., a set of metrics may be collected at individual nodes, analyzed and/or displayed via an easy-to-interpret graphical user interface in various embodiments. Isolation and security techniques 270 may include the use of encryption for various types of control plane messages in addition to the verification and validation of decision making logic provided by customers as discussed above in some embodiments. The NFVS may also provide proactive maintenance 272, e.g., by automating regular reboots, software updates, hardware refreshes and the like at several of its components without requiring application downtime in some embodiments.

As indicated above, in various embodiments clients of the NFVS may provide decision making logic modules or plugins 212 that can be deployed using the NFVS infrastructure and features to construct highly available and performant decision making pipelines. Similarly, in at least some embodiments, clients may provide action implementation logic modules/plugins 214 that can be used to perform the desired types of packet processing, with properties such as scalability, responsiveness, availability and the like being managed transparently by the NFVS. In some embodiments, policies 216 or rules regarding the manner in which state information for packet processing is to be maintained may be provided or customized by clients—e.g., clients may indicate how many replicas of state information are to be maintained, the types of persistent storage devices to be used, and so on. In one embodiment, clients may not necessarily choose to customize one or more of the components 210 shown in FIG. 2, and may instead utilize versions of the components 210 provided by the NFVS.

Example Packet Flow Definition Elements and Processing Action Elements

Figure 3:
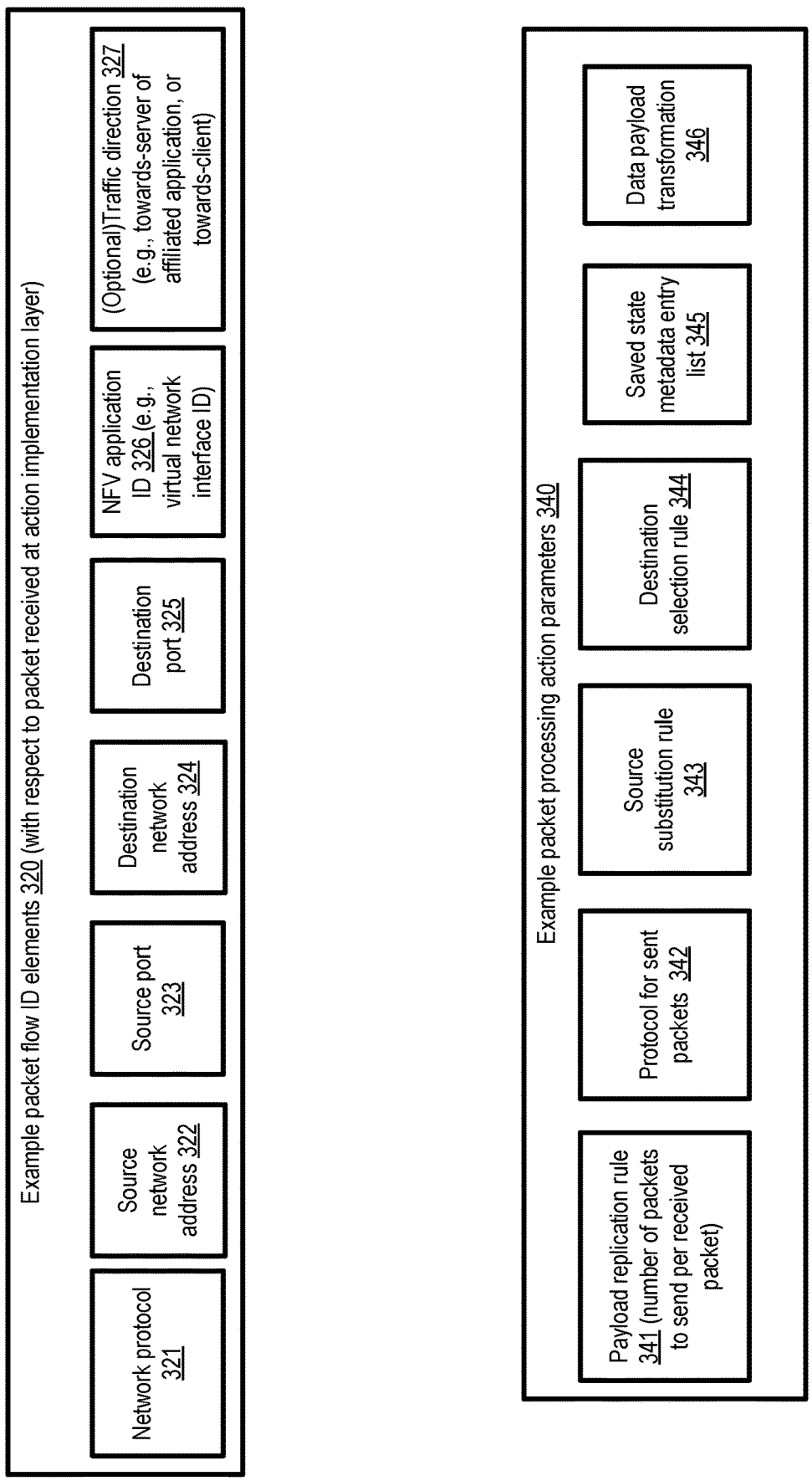
FIG. 3 illustrates example packet flow identification elements and example packet processing action parameters, according to at least some embodiments.

As mentioned above, in some embodiments packet processing actions may be identified for groups of related packets, which may be referred to as packet flows. FIG. 3 illustrates example packet flow identification elements and example packet processing action parameters, according to at least some embodiments. A flow may be characterized (or distinguished from other flows) based on one or all of the following attributes or elements 320 of packets received at the NFVS in the depicted embodiment: the network protocol 321 used for sending the packet to the NFVS, the source network address 322, the source port 323, the destination network address 324, the destination port 325, an application identifier 326 (e.g., an identifier of a specific virtual network interface set up for the application), and/or the traffic direction 327 with respect to the application for which the packet processing is being performed (e.g., whether a packet represents a client request being sent towards a back-end server of the application, or whether the packet is being sent to a client device from a back-end server in response to an earlier request). In some embodiments the traffic direction 327 may be implied by or deduced from the source and destination addresses. A number of different networking protocols may be supported in different embodiments—e.g., including the Internet Protocol (IP), the Transmission Control Protocol (TCP), the User Datagram Protocol (UDP), the Internet Control Message Protocol (ICMP), protocols that do not belong to or rely on the TCP/IP suite of protocols, and the like. The particular combination of attributes that are used to distinguish one flow from another for a given packet processing application requirement or client may be referred to collectively as packet flow identifier elements 320 in some embodiments. The process of selecting a particular node or cell from among the accessible nodes/cells of the NFVS layers may include flow hashing in some embodiments. Some or all of the packet flow identifier elements 320 of a given packet may be aggregated (e.g., via concatenation or using some other function) in some implementations, and the result of the aggregation may be provided as input to a selected hash function, with the output of the hash function used to select the particular node or cell as part of the flow hashing An NFVS may support a variety of packet processing actions in the depicted embodiment. A packet processing action identified at the decisions layer of the NFVS and implemented/enforced at the action implementation layer may include any combination of several elements, rules or parameters. The particular set of parameters used for a given client requirement may differ from the particular set of parameters used for a different requirement of the same client (or from the parameter set used for some other client's requirement). A payload replication rule 341 may indicate how many replicas of a given received packet's contents or body are to be transmitted to respective destinations—e.g., if a multicast protocol is to be implemented for a given client and the destination multicast group contains eight endpoints, the payload replication parameter may indicate that eight replicas are to be transmitted. By default, e.g., if a payload replication rule is not included, a single outbound or transformed packet may be generated corresponding to each received packet in some embodiments.

For some packet processing applications, in some embodiments the NFVS may act as a protocol translator—e.g., incoming packets may be received via a particular networking protocol (such as TCP), while corresponding outgoing packets may be sent via a different protocol (such as UDP). The protocol for sent packets parameter 342 may indicate whether such a protocol change is to be implemented, and if so, the specific protocol to be used for the transformed packets. Source substitution rule 343 may indicate whether the source address and/or source port are to be changed, and if so, the acceptable source (address, port) range to be used for the transformed packets in various embodiments. Similarly, destination selection rule 344 may indicate whether the destination address and/or port is to be changed as part of a packet transformation, and if so, what the acceptable destination addresses and/or ports are for the flow being considered. In some cases (e.g., for multicast), multiple destinations may be indicated corresponding to a given received packet.

The particular kinds of metadata (e.g., traffic rates, packet drop rates, etc.) to be collected for a given flow and stored as part of the state information at a distributed state manager may be indicated via saved state metadata entry list 345 in the depicted embodiments. In at least some embodiments, in addition to packet processing operations that involve manipulating or modifying header elements, the data payload of the packets may be modified. The specific data payload transformation(s) 346 (e.g., decryption using a specified algorithm), if any, to be implemented may represent another parameter of the packet processing action 340 in the depicted embodiment. In some embodiments, at least some packet processing actions may not take all the different parameters shown in FIG. 3 into account, and/or parameters not shown in FIG. 3 may be considered for some packet processing applications.

Example Packet Processing Categories

Figure 4:
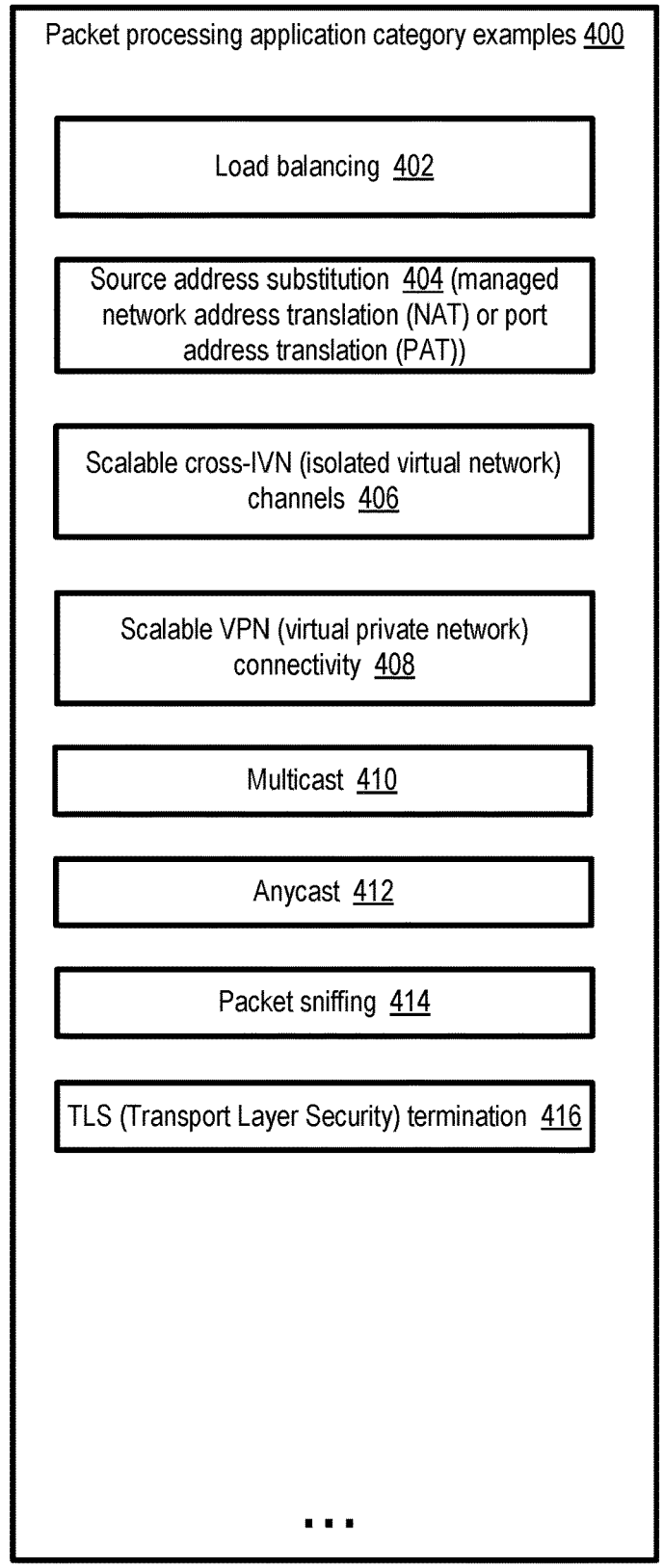
FIG. 4 illustrates example categories of packet processing applications that may be implemented using a network function virtualization service, according to at least some embodiments.

Using the kinds of NFVS features and packet processing parameters introduced above, a variety of types of packet processing tasks may be accomplished in a scalable manner in different embodiments. FIG. 4 illustrates example categories of packet processing applications that may be implemented using a network function virtualization service, according to at least some embodiments.

As shown, packet processing categories 400 in the depicted embodiment may include, for example, load balancing 402, source address substitution 404 (which may include managed network address translation (managed NAT) and/or managed port address translation (managed PAT)), scalable cross-IVN (isolated virtual network) channels 406, scalable VPN (virtual private network) 408, multicast 410, stateful anycast 412, packet sniffing 414, data injection 416, TLS (Transport Layer Security) termination and the like. Other types of packet processing applications may be supported in various embodiments. In general, the NFVS may be configurable to implement any desired type of packet processing or transformations, with nodes being assignable dynamically at each layer to support a large range of traffic rates in a transparent and scalable manner.

Any of wide variety of load balancing algorithms 402 may be implemented using the NFVS in different embodiments, such as round-robin load balancing, connection count-based load balancing, rejection based load balancing and the like. Source address substitution 404, as the name suggests, may involve replacing, for the packets of a particular flow, the source address and port in a consistent manner.

In some embodiments, the NFVS may be implemented at a provider network in which isolated virtual networks can be established. For example, an isolated virtual network (IVN) may be set up for a particular customer by setting aside a set of resources for exclusive use by the customer, with substantial flexibility with respect to networking configuration for that set of resources being provided to the customer. Within their IVN, the customer may set up subnets, assign desired private IP addresses to various resources, set up security rules governing incoming and outgoing traffic, and the like. At least in some embodiments, by default the set of private network addresses set up within one IVN may not be accessible from another IVN. In various embodiments, the NFVS may act as an intermediary or pathway between the private address spaces of two or more different IVNs, in effect setting up scalable and secure cross-IVN channels 406. In at least some embodiments, the NFVS may also or instead be used to support scalable VPN connectivity 408 between some set of resources within a provider network and one or more client networks or client premises outside the provider network.

Multicast 410 is a networking technique, implementable using an NFVS in some embodiments, in which contents (e.g., the body or data payload) of a single packet sent from a source are replicated to multiple destinations of a specified multicast group. In contrast, stateful anycast 412 as implemented in various embodiments may involve selecting, for all the packets of a given flow that are received at the NFVS, a particular destination from among a specified set of destinations (e.g., regardless of workload level changes).

Packet sniffing 414 may involve examining contents of some or all packets of a flow, e.g., for security-related applications in some embodiments. TLS (Transport Layer Security) termination 416 may involve, for example, decrypting the contents of packets that are encrypted and passing the decrypted contents on to one or more destinations in various embodiments. Other categories of packet processing applications may be supported using the NFVS in different embodiments, while at least some of the types of applications indicated in FIG. 4 may not be supported in some embodiments.

Example Configuration Options for Decisions Layer Components

Figure 5:
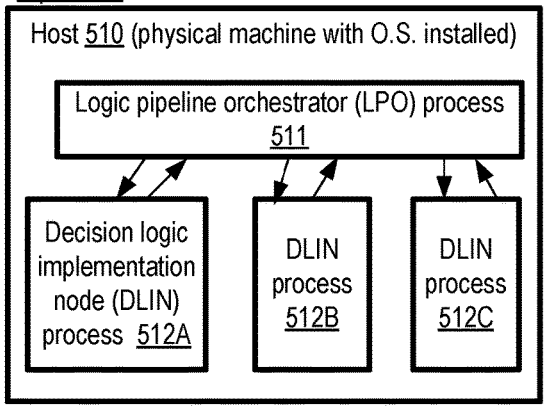
FIG. 5 illustrates examples of options for configuring decision logic pipeline orchestrators and decision logic implementation nodes of a network function virtualization service, according to at least some embodiments.
Figure 5:
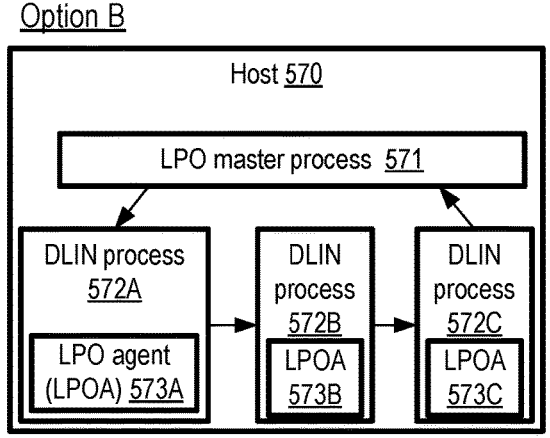
Figure 5:
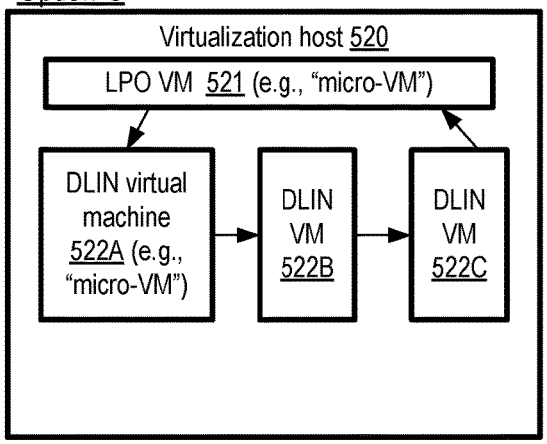
Figure 5:
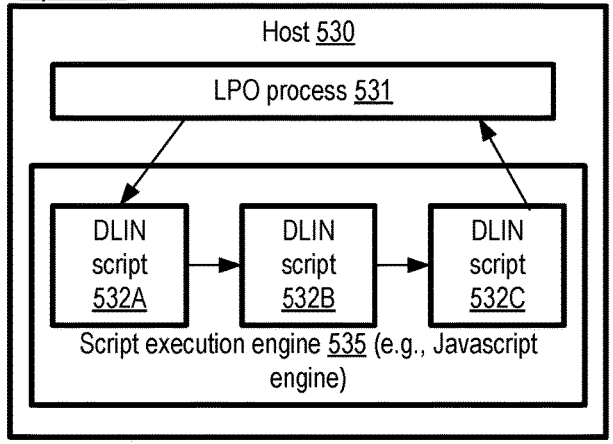
Figure 5:
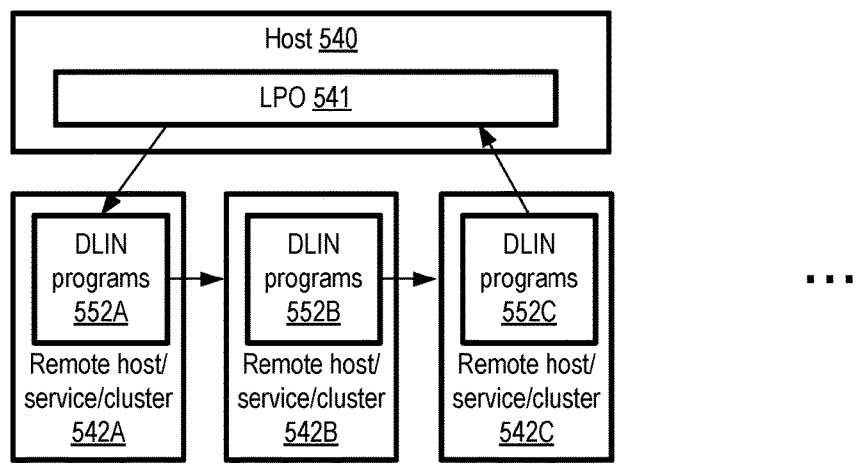

A number of different techniques may be used to implement the components of the action decisions layer of the NFVS (e.g., of a given decision making cell) in different embodiments. FIG. 5 illustrates examples of options for configuring decision logic pipeline orchestrators and decision logic implementation nodes of a network function virtualization service, according to at least some embodiments. In various embodiments, a given logic pipeline orchestrator may be implemented using a combination of one or more hardware and/or software components of one or more hosts. Similarly, a given decision logic implementation node may comprise a combination of one or more hardware and/or software components of one or more hosts. The total number of hosts used to implement a given combination of one or more LPOs and one or more DLINs associated with an application, and the manner in which these two types of nodes communicate with one another, may vary in different embodiments.

In an embodiment in which Option A of FIG. 5 is used, an LPO 511 may comprise one process running within an operating system at an un-virtualized host 510 (a host at which virtual machines are not launched), and individual ones of DLINs 512, such as DLINs 512A, 512B or 512C may comprise respective processes also running at the same host. The LPO process 511 may act as an intermediary for messages among the DLINs in Option A. For example, an initial request for implementing a portion of the overall decision logic for a new flow or packet group may be sent to DLIN 512A from LPO 511, a response to that initial request may be sent back to the LPO 511, the LPO 511 may then send a request for additional decision logic work to DLIN 512B, receive a corresponding response and then send a final request of the pipeline to DLIN 512C and obtain the final response from DLIN 512C. The requests and responses may, for example, be transmitted using TCP or UDP socket APIs in some embodiments. As discussed earlier, respective decision making logic corresponding to one or more of the DLINs and/or the LPO itself may be received from clients of the NFVS in various embodiments.

In some embodiments in which Option B is used, the LPO itself may be implemented in a distributed manner within a given host. For example, an LPO at host 570 may comprise a master process 571 and one or more agents 573 that are incorporated (e.g., as respective threads) within individual ones of DLIN processes 572. In such embodiments, the agents 573 may be responsible for routing decision logic requests among the DLINs—e.g., after the decision processing work done at DLIN 572A is completed, agent 573A may transmit a request for the next state of decision processing to DLIN 572B, and when DLIN 572B completes its portion of decision processing, agent 573B may transmit a request for the final stage of decision processing to DLIN 572C. Using Option B, the total number of messages transmitted for completing the decision logic processing may be reduced, relative to the number of messages transmitted in Option A, in the depicted embodiment.

In at least some embodiments, respective virtual machines may be employed for LPOs and/or one or more DLINs, as shown in Option C of FIG. 5. In the depicted embodiment, one virtual machine 521 is used for the LPO at a virtualization host 520, while three other VMs 522A, 522B and 522C are instantiated to implement respective DLINs at the same host 520. In some embodiments, the virtualization host 520 may be part of a fleet of hosts of a virtualized computing service (VCS) of a provider network. In at least one embodiment, a set of virtualization management components (VMCs) at the host 520 may comprise one or more offloading cards—e.g., networking-related operations and/or other I/O operations required for managing the virtual machines may be performed at a card connected to the host's CPUs via a peripheral bus, thereby enabling more of the host's computing capacity to be allocated to the VMs. In some embodiments, the VCS may support virtual machines of several different "sizes" or computing capacities, including for example "large", "medium", "small" and "micro" VMs. In one such embodiment, if the complexity of the customer-provided plugin for a given DLIN is low, a micro-VM may be employed for the DLIN. Micro-VMs may also be used for the LPO 521 in some embodiments. For example, in an embodiment the VMCs may include a virtual machine monitor which can leverage the Linux Kernel-based Virtual Machine (KVM) made available in Linux, and other virtualization features, to run lightweight micro-VMs at near-native speeds. The virtual machine monitor may run as a user-space process and provide minimal device emulation to the guest OS (e.g., a standard PC device model including a block and network devices), and may not include non-essential functionality (e.g., VGA and other legacy device emulators) to achieve faster startup and a reduced memory footprint. The virtual machine monitor process may also be responsible for exposing a control API that can be invoked by programs under control by the NFVS, enforcing micro-VM sandboxing, and handling rate limiting. Other categories of VMs may be used for DLINs 522 and/or LPOs in some embodiments. The use of VMs as in Option C may help to isolate the programs being executed for the LPOs and the DLINs from one another in at least some embodiments. In one embodiment, one or more of the machine images used for the VMs of Option C may be provided by a client of the NFVS.

In some embodiments, an alternative approach indicated in Option D may be employed. Individual DLINs 532, such as 532A, 532B and 532C may comprise respective executable scripts (e.g., provided by the client on whose behalf the packet processing is to be performed) in such embodiments, and the LPO 521 running at a host 530 may employ one or more script execution engines (such as a JavaScript engine) at the same host to execute the scripts on the appropriate sequence.

In at least one embodiment, resources running at remote hosts (relative to the LPO) may be used for DLINs. For example, the scenario indicated in Option E may be used—the LPO 541 may run on one host 540, and respective DLIN programs 552A, 552B and 552C may comprise programs running at other hosts 542A, 542B or 542C. In some cases, a given DLIN may itself utilize resources of multiple hosts or other computing devices—e.g., DLINs 542 may each utilize a cluster of computing devices of a network accessible service other than the NFVS itself. Programs at remote resources may be invoked via web service APIs or the equivalent in some embodiments to implement the decision making logic of the application.

Note that although the DLINs illustrated in Options C, D and E of FIG. 5 are shown as communicating directly among themselves, in some embodiments the LPOs (e.g., LPO 521, 531 and/or 541) may act as an intermediary for inter-DLIN messages, in a manner similar to that indicated in Option A. In at least some embodiments, combinations of the approaches illustrated in FIG. 5 may be used—e.g., some DLINs of a given DLIN pipeline or decision making cell may be implemented using processes or VMs running on the same host as a corresponding LPO, while others may be implemented using remote computing devices accessed from the LPO over a network connection.

Alternative Message Paths for Retrieving Actions from Decisions Layer

Figure 6:
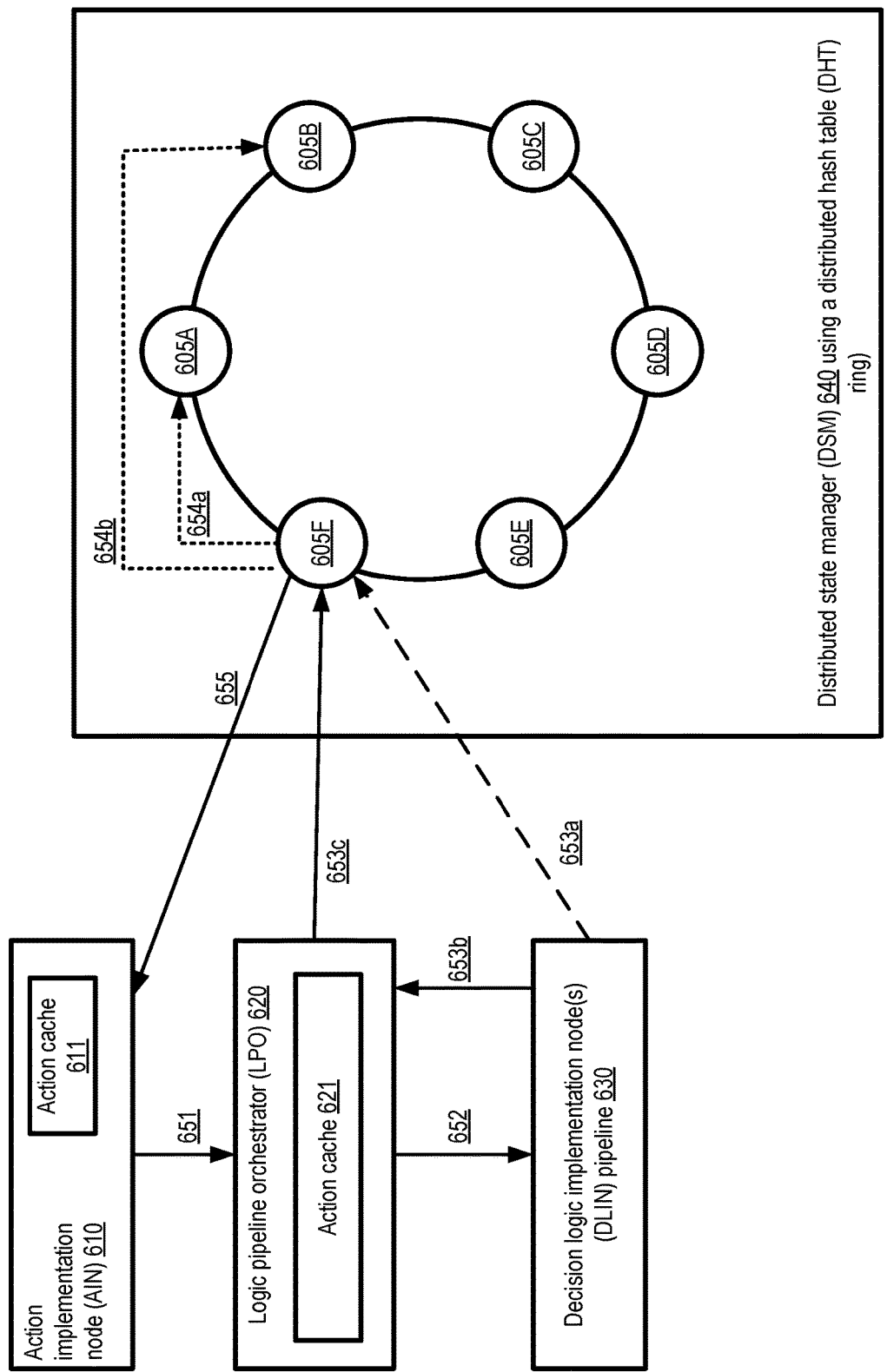
FIG. 6 and FIG. 7 illustrate respective message pathways that may be employed to generate and cache packet processing actions at action implementation nodes of a network function virtualization service, according to at least some embodiments.
Figure 7:
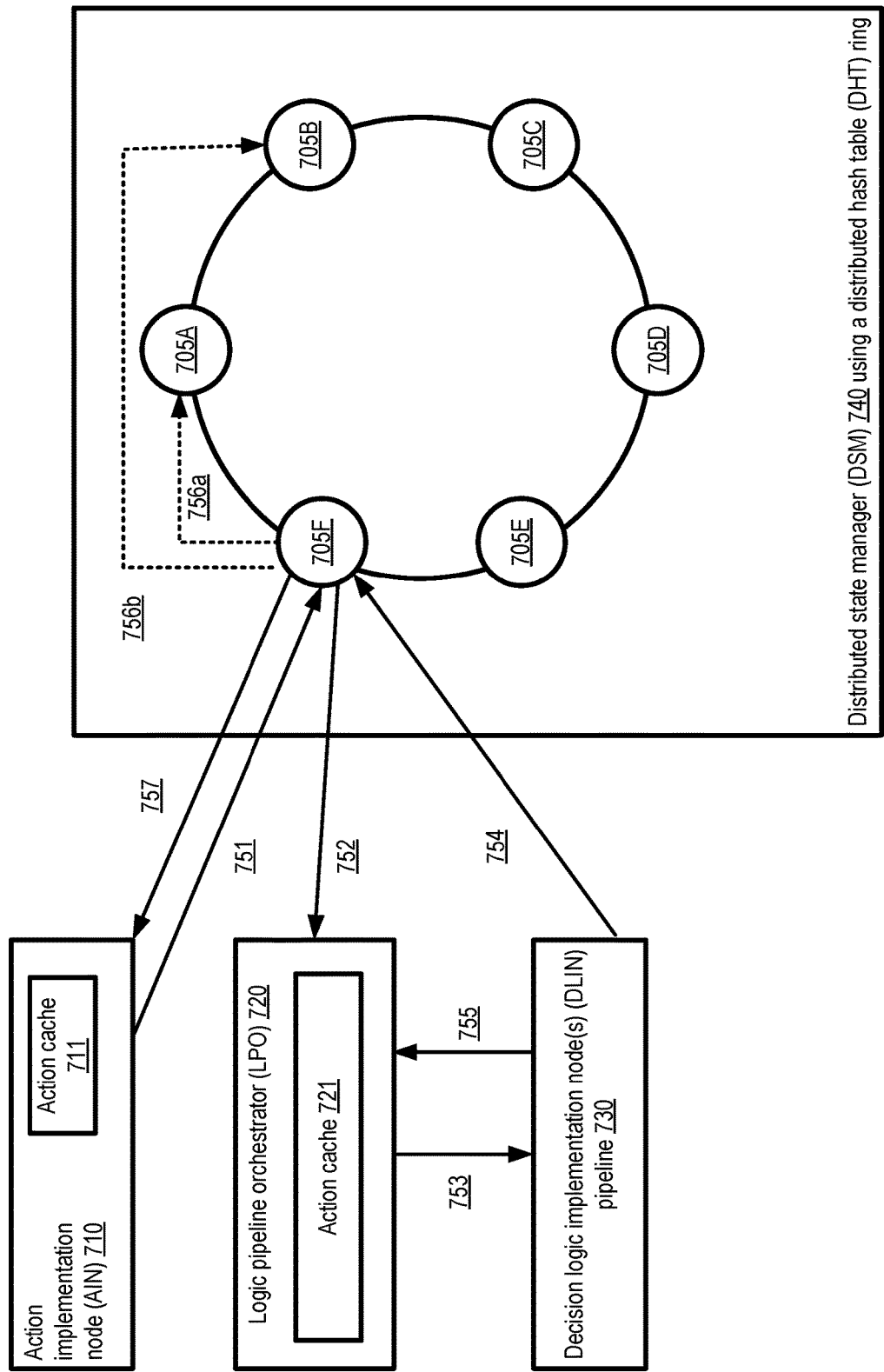

FIG. 6 and FIG. 7 illustrate respective message pathways that may be employed to generate and cache packet processing actions at action implementation nodes of a network function virtualization service, according to at least some embodiments. In the embodiment depicted in FIG. 6, the distributed state manager 640 of a cell comprising a logic pipeline orchestrator (LPO) 620 and a pipeline 630 of one or more DLINs may comprise a distributed hash table (DHT) ring with a plurality of hash entry storage nodes 605 (e.g., 605A-605F).

An action implementation node 610 may first attempt to find an action corresponding to a received packet (or the received packet's flow) in its own action cache 611 in the depicted embodiment. If an action to be implemented for the packet is not found in cache 611, a request for the action may be sent to LPO 620, as indicated by the arrow 651. The LPO 620 may itself maintain an action cache 621, and may attempt to find the action in that cache. If an action for the packet is not present in the cache 621, a pipeline 630 comprising one or more DLINs may be used to determine the action in the depicted embodiment.

In at least one embodiment, an indication of the action identified for the flow or packet may be provided directly from a DLIN (e.g., the final DLIN of the pipeline 630) to a selected node of the DSM 640, such as node 605F, as indicated by arrow 653a. Entries corresponding to different portions of a flow key space being managed using the DHT may be stored at respective nodes 605 of the DHT, and node 605A may be selected, using a hash function applied to elements of the flow identifier, as the primary node for storing state information for the flow for which the action was determined at pipeline 630 in the depicted embodiment. One or more non-primary nodes may also be identified to replicate the state information of the flow in at least some embodiments—e.g., as indicated by arrows 654a and 654b, replicas of the state information may be stored at non-primary nodes 605A and 605B. In at least one embodiment, each of the ring nodes 605 may comprise sufficient information about other nodes of the DHT to be able to, for example, select (at a given node designated as the primary) a set of non-primary nodes at which state information is to be stored, and transmit the state information to the selected set of non-primary nodes. In some embodiments, the primary DHT node 605F may confirm that the state information (including, for example, a representation of the action identified at pipeline 630) has been successfully replicated at one or more non-primary nodes before sending a representation of the action to the AIN 610 (as indicated by arrow 655). The action may be implemented at the AIN 610, and an entry indicating the action may be stored in cache 611, from which it may be retrieved when subsequent packets of the same flow (if any) are received at the AIN 610.

In at least some embodiments, an indication of the action may be provided from the DLIN pipeline to the LPO 620 (as indicated by arrow 653b), and stored in the LPO's action cache 621. In one embodiment, information about the action determined by the pipeline 630 may be transmitted to the DHT from the LPO 620, as indicated by arrow 653c (e.g., instead of, or in addition to, the transmission of the action directly from the pipeline 630 to the DHT). In one embodiment, the action may be provided from the pipeline 630 or the LPO 621 to the AIN 610, e.g., instead of or in addition to the transmission indicated by arrow 655.

In the embodiment depicted in FIG. 7, the distributed state manager 740 of a cell comprising a logic pipeline orchestrator (LPO) 720 and a pipeline 730 of one or more DLINs may also comprise a distributed hash table (DHT) ring with a plurality of hash entry storage nodes 705 (e.g., 705A-705F). When an AIN 710 fails to find an action for a given received packet of a given flow in its local cache 711, a request for the action may be sent directly to a selected node 705F of the DHT in some embodiments, as indicated by arrow 751. If that node, which may be the primary DHT node eventually responsible for maintaining state information for the flow, currently does not have a representation of the action to be performed for the flow, a request for the action may be sent to the LPO 720 in the depicted embodiment.

If the LPO 720 does not have an entry for the action in its cache 721, pipeline 730 may be used to determine the action to be taken. The action identified using the pipeline may be transmitted to the primary node 705F of the DHT in the depicted embodiment (arrow 754), as well as to the LPO 720

(arrow 755). At the DHT, an entry comprising state information for the flow may be replicated to one or more non-primary nodes such as 705A and 705B (arrows 756a and 756b) from the primary node 705F in some embodiments. A representation of the action may be provided directly from the primary DHT node 705F to the AIN, as indicated by arrow 757 in the depicted embodiment. In some embodiments, the representation of the action may be provided from the LPO to the AIN, e.g., instead of or in addition to being provided from the DHT. As may be discerned by comparing FIG. 6 and FIG. 7, in some embodiments AINs may be permitted to transmit requests directly to the distributed state manager, while in other embodiments AINs may not transmit such requests directly to the distributed state manager.

Example Programmatic Interactions for Configuring Packet Processing

Figure 8:
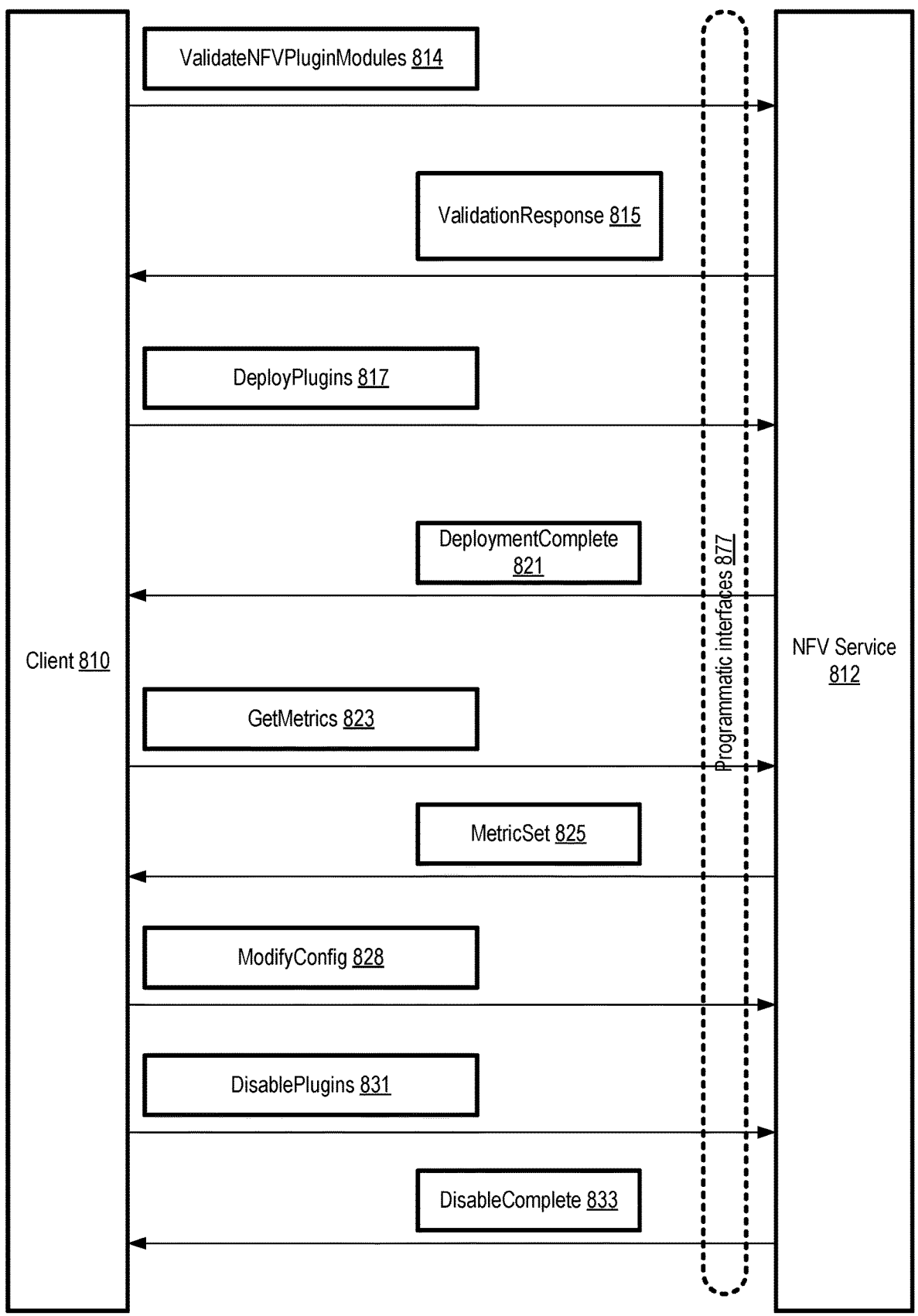
FIG. 8 illustrates example programmatic interactions between clients and a network function virtualization service, according to at least some embodiments.

FIG. 8 illustrates example programmatic interactions between clients and a network function virtualization service, according to at least some embodiments. In the depicted embodiment, an NFVS 812, similar in capabilities and functionality to NFVS 102 of FIG. 1, may include a web service frontend including web servers implementing a set of programmatic interfaces 877 such as a set of application programming interfaces (APIs), a web-based console, command line tools, graphical user interfaces and the like, which may be used by clients 810 to submit various types of requests to configure packet processing for their applications.

In at least some embodiments, a client 810 may submit a ValidateNFVPluginModules request 814 via a programmatic interfaces 877 to the NFVS. Such a validation request may comprise indications of one or more decision making logic plugin modules to be used for decision making and/or action implementation on behalf of the client 810 in the depicted embodiment. In some cases, a request 814 may include decision making logic such as executable programs or scripts, while in other cases pointers to sources from which decision making logic may be accessed (e.g., URLs to which web service requests may be transmitted to access or the decision making logic) may be included in the validation request. The validation request 814 may also indicate the overall application objective that is intended to be achieved using packet processing in some embodiments—e.g., whether load balancing is the goal, source address substitution is the goal, and so on. In response, the NFVS may perform one or more validation/verification actions to ensure that the plugin modules or programs meet acceptance criteria—e.g., the output generated by the plugins in response to a set of test packets may be examined, the number of output packets generated in response to a given input packet may be counted, the specific changes made to headers and/or data portions of test input packets may be scrutinized to verify compatibility with the stated objective, and so on. Based on the results of the analysis, the NFVS may transmit a validation response message 815 to the client in the depicted embodiment, indicating whether the plugins are acceptable or not.

If the plugins are validated/verified successfully, the client 810 may submit a DeployPlugins request 817 to the NFVS, indicating for example an initial configuration to be used for the client's application. The configuration may be specified indirectly in at least some embodiments, e.g., by providing an estimate of the number of packets or flows expected to be processed during some period of time, the amount of metadata to be saved as part of the state information, the rate at which state changes are expected, and so on. In other embodiments, more specific details about the configuration may be provided, such as the number of action implementation nodes/cells, the number of decision making cells, DLINs, logic pipeline orchestrators, etc. that are desired. The NFVS may allocate an initial set of resources (e.g., physical hosts, virtual machines etc.) for the deployment, deploy the plugins to the resources, and transmit a DeploymentComplete message 821 to the client indicating that the NFVS is ready for application traffic to commence in the depicted embodiment. Packets received from the origin endpoints of the client's application may then be processed using the plugins, and corresponding output packets may be transmitted to the intended recipient endpoints in accordance with the decision logic implemented by the client's plugins.

In various embodiments, the NFVS may expose a number of metrics to clients, e.g., indicating the size of the configuration set up for a client, the resource utilization levels at various platforms of the configuration, the size of stored state information, response times for various types of messages, and the like. In the depicted embodiment, a GetMetrics request 823 may be submitted by the client via programmatic interfaces 877 to view some or all of the available metrics at various points during the lifetime of the client's packet processing application. The requested metrics may be provided, for example, via one or more MetricSet messages 825. In at least some embodiments, easy-to-understand visualizations of the requested metrics may be provided via an interactive interface, allowing the client to for example zoom in on subsets of the metrics, obtain temporal correlations of different subsets of the metrics, and so on. In some embodiments, a client may request changes to the configuration (e.g., requesting additional cells at the action implementation layer and/or the decisions layer) by submitting ModifyConfig messages 828.

If/when a client wishes to terminate the execution of their packet processing plugins, in some embodiments a DisablePlugins message 831 may be submitted in various embodiments, identifying the specific configuration or plugin set that is to be decommissioned. In response, the appropriate configuration operations to disable/uninstall the plugins may be performed at the NFVS 812 in the depicted embodiment, and a DisableComplete message 833 may be sent to confirm that the requested disabling operations have been completed successfully. It is noted that other types of programmatic requests may be supported in some embodiments than those shown in FIG. 8, and that at least some of the illustrated requests may not be supported in some embodiments.

Multi-Tenant Decision Layer Cell Example

Figure 9:
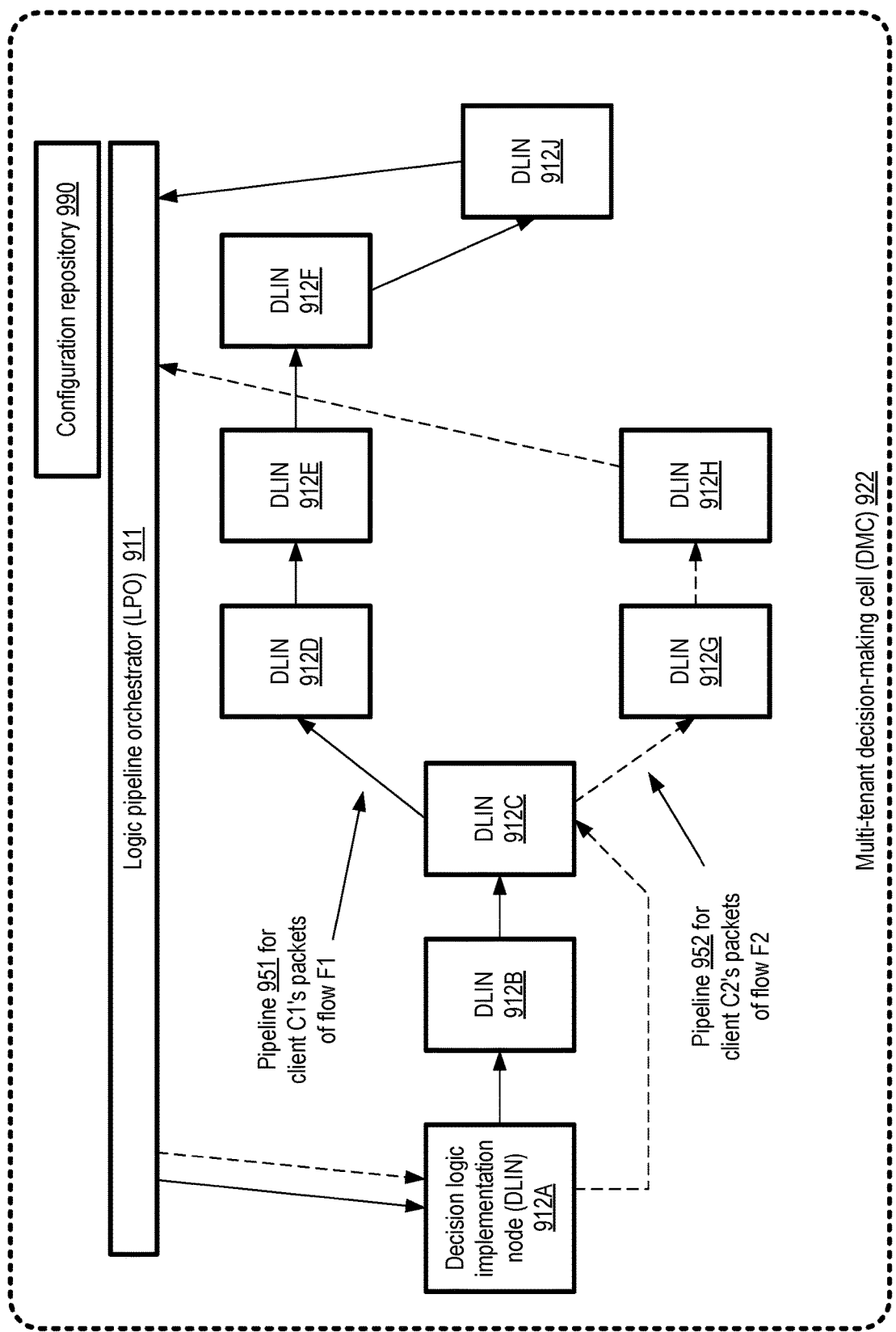
FIG. 9 illustrates example uses of different combinations of decision logic implementation nodes for respective clients at a multi-tenant action decision making cell of a network function virtualization service, according to at least some embodiments.

In some embodiments, as mentioned earlier, various resources of the NFVS may be utilized in multi-tenant mode, e.g., a given host or node may be utilized for multiple applications of different clients (or multiple applications of the same client). FIG. 9 illustrates example uses of different combinations of decision logic implementation nodes for respective clients at a multi-tenant action decision making cell of a network function virtualization service, according to at least some embodiments.

In the embodiment depicted in FIG. 9, a multi-tenant decision making cell 922 of an NFVS may comprise a logic pipeline orchestrator (LPO) 911 and a plurality of decision logic implementation nodes (DLINs) 912, such as DLIN 912A, 912B, 912VC, 912D, 912E, 912Fm 912G, 912H and 912J. The DLINs 912 may in effect be considered building blocks, such that respective pipelines involving combinations of the building blocks can be constructed based on the needs of different clients of the NFVS. Clients may provide programmatic indications of the specific types of DLINs needed for their applications, and information about the pipelines of different clients may be stored in a configuration repository 990 in the depicted embodiment. When a particular packet for which an action is to be identified is received at the LPO 911, the configuration of the DLIN pipeline that is to be employed for that packet may be retrieved from the configuration repository, and then the LPO 911 may coordinate the use of the DLINs forming that pipeline to identify the action.

In the example scenario depicted in FIG. 9, a pipeline 951 comprising the DLIN sequence 912A-912B-912C-912D-912E-912F-912J may be utilized for a flow F1 of a client C1, while a different pipeline comprising the DLN sequence 912A-912C-912G-912H may be used for flow F2 of a different client C2. As indicated in the figure, some DLINs (such as 912A and 912C) and/or an LPO (such as 911) may be used for multiple clients in at least some embodiments. Furthermore, the output of a given DLIN may be included in the input consumed by more than one other DLINs—e.g., the output of DLIN 912C may be provided as input to DLIN 912D or DLIN 912G.

As mentioned earlier, in at least some embodiments clients of the NFVS may provide decision making logic plugins which may be utilized at some or all of the DLINs 912. In at least some embodiments, the operators of the NFVS itself may author or license the decision making logic used at some DLINs (e.g., a DLIN that performs load balancing using a particular algorithm) and advertise the existence of such DLINs to potential or actual clients, enabling the clients to re-use existing decision making building blocks for their own pipelines. In one embodiment, for example, a "DescribeAvailablePlugins" API or the equivalent may be exposed by a webserver coupled to the NFVS, which may be used by clients to learn about existing DLINs/plugins that can be employed on behalf of the clients. Note that although the distributed state manager of the DMC 922 is not shown in FIG. 9, a DSM may also be used for multiple clients in various embodiments. In at least some embodiments, a given action implementation node or action implementation cell may be assigned to handle packet processing actions for more than one client and/or more than one application. In one embodiment, a client may request that one or more resources/nodes/cells of the NFVS be allocated in single-tenant mode, e.g., for use solely by the client's application; as such, both single-tenant and multi-tenant modes of operation may be supported in some embodiments.

Multi-Host Decision Pipeline Example

Figure 10:
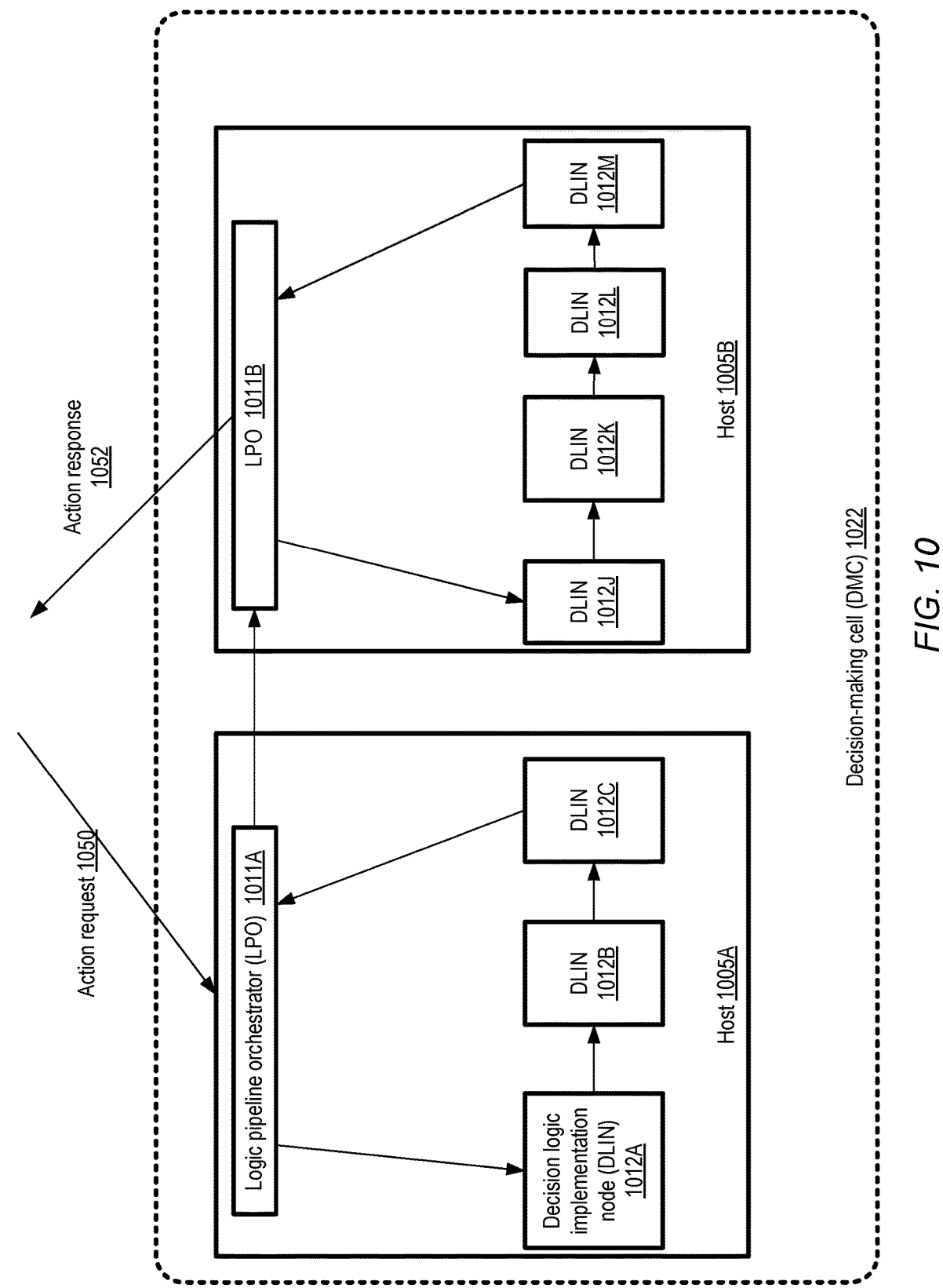
FIG. 10 illustrates an example configuration in which a pipeline of decision logic implementation nodes at multiple hosts may be utilized for a given collection of packets, according to at least some embodiments.

FIG. 10 illustrates an example configuration in which a pipeline of decision logic implementation nodes at multiple hosts may be utilized for a given collection of packets, according to at least some embodiments. In the depicted embodiment, an action request 1050 (resulting for example from a cache miss at an action implementation node) may be received at a first logic pipeline orchestrator 1011A running at a host 1005A of a decision making cell 1022. The action request may, for example, include the particular packet (or at least values of one or more headers of the packet) for which an action is to be performed; as indicated earlier, such a packet may be the first of a group of related packets for which the same type of network function action(s) may be implemented. For any of a variety of reasons, the set of decision logic implementation nodes (DLINs) 1012 to be used for determining the actions for the packet or group of packets may be distributed among more than one host 1005, such as host 1005A and 1005B in the depicted embodiment. Such reasons may include, for example, performance-based reasons (e.g., in scenarios where combining all the DLINs onto the same host 1005 may result in overloading the host), DLIN implementation requirement reasons (e.g., some DLINs may be designed for respective operating systems, scripting engines, hardware device types such as particular types of CPUs/GPUs/peripheral devices etc., that may be available only at specific hosts), separation-of-function reasons (e.g., to keep only those DLINs that perform closely related types of decisions on the same hosts), and/or client preferences (e.g., some clients that provide custom DLIN plugins may only want those DLINs to be run on hosts that meet a particular criterion).

In the depicted scenario, a first sub-pipeline comprising three DLINs 1012A, 1012B and 1012C may be implemented for determining packet processing actions for a particular group of packets at host 1005A, and a second sub-pipeline comprising four DLINs 1012J, 1012K, 1012L and 1012M may be implemented at a second host 1005B. A first logic pipeline orchestrator (LPO) 1011A at host 1005A may be responsible in the depicted embodiment for (a) ensuring that the DLINs of its local sub-pipeline (DLINs 1012A, 1012B and 1012C) are invoked in the appropriate order and (b) an indication of the results produced at the local sub-pipeline is provided to a second LPO 1011B running at host 1005B. At host 1005B, the second LPO 1011B may in turn be responsible in the depicted embodiment for (a) ensuring that the DLINs of its local sub-pipeline (DLINs 1012J, 1012K, 1012L and 1012M) are invoked in the appropriate order and (b) an action result 1052 resulting from the execution of both sub-pipelines is provided to one or more destinations such as the AIN that submitted the action request 1050. In some embodiments, chains of respective sub-pipelines implemented at several hosts may be implemented. In at least one embodiment, such multi-host pipelines may not be supported by the network function virtualization service.

Example Use of NFVS at a Provider Network

In at least some embodiments, as mentioned earlier, a network function virtualization service (NFVS) may be implemented and/or used at least in part at a provider network. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in various embodiments. At least some provider networks may also be referred to as "public cloud" environments in some embodiments. A given provider network may include numerous data centers hosting various resource pools, such as collections of physical and/or virtualized compute servers, storage devices, networking equipment and the like, needed to implement, configure and distribute the infrastructure and services offered by the provider.

Figure 11:
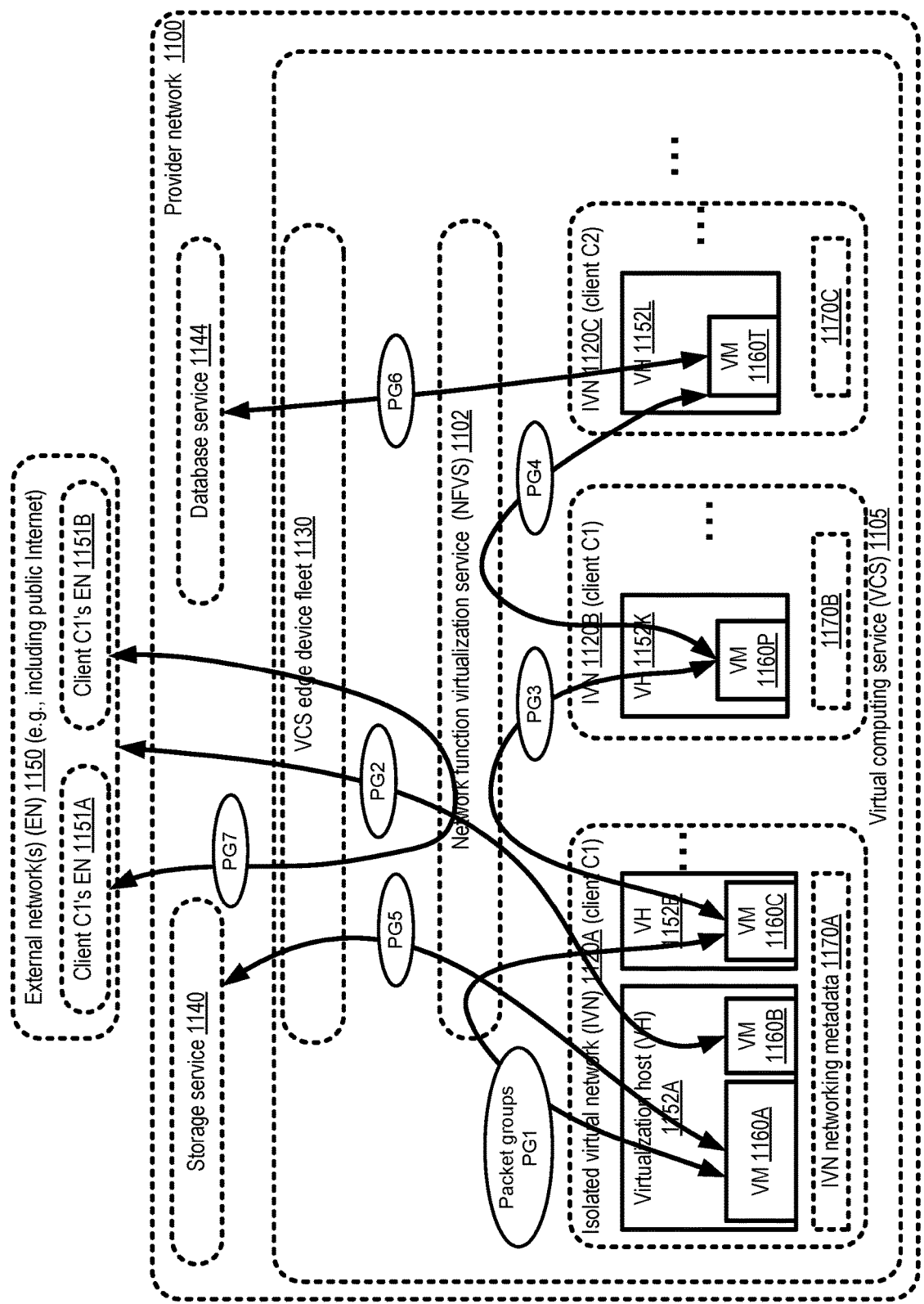
FIG. 11 illustrates examples of the use of network function virtualization along network pathways which may originate or terminate at isolated virtual networks of a provider network and/or at networks external to a provider network, according to at least some embodiments.

FIG. 11 illustrates examples of the use of network function virtualization along network pathways which may originate or terminate at isolated virtual networks of a provider network and/or at networks external to a provider network, according to at least some embodiments. Several different network-accessible services may be implemented at provider network 1100 of FIG. 11, including, for example, a virtual computing service (VCS) 1105, a storage service 1140 and a database service 1144. The VCS may comprise a plurality of virtualization hosts (VHs) 1152, such as 1152A, 1152B, 1152K and 1152L in the depicted embodiment, at each of which one or more virtual machines (VMs) 1160 (e.g., VMs 1160A, 1160B, 1160C, 1160P and 1160T) may be instantiated on behalf of one or more VCS clients. Each virtualization host may also include other components not shown in FIG. 11, such as a respective virtualization manager acting as an intermediary between the VMs of the host and at least some of the hardware components of the host. In some embodiments, at least some portions of a virtualization manager may be implemented at an offloading device, such as a card that is attached via a peripheral bus to the CPUs of the virtualization host. Such offloading techniques may, for example, enable a larger fraction of the computing resources of the virtualization hosts to be deployed to the virtual machines set up on behalf of clients, as opposed to being deployed for virtualization management tasks.

In at least some embodiments, the VCS 1105 may support the capability of setting up isolated virtual networks (IVNs) on behalf of various clients. Each IVN 1120 may include a respective subset of resources of the VCS, over whose networking configuration the client is granted substantial flexibility. For example, IVN 1120A (established for client C1) includes VHs 1150A and 1150B in the depicted embodiment, IVN 1120B (also set up for client C1) includes VH 1150K, and IVN 1120C (set up for client C2) includes VH 1150L. A given client such as C1 may establish multiple IVNs for various purposes—e.g., IVN 1120A may be set up for hosting a web application for access from external networks 1150 (which may for example include portions of the public Internet and/or a client-owned network) such as network 1151A, while IVN 1120B may be set up for the development of the web applications. Generally speaking, the VCS may allow the traffic associated with a given IVN to be isolated or separated from the traffic associated with any other IVN in the depicted embodiment, unless of course the clients for whom the IVNs are established indicate otherwise. With respect to a given IVN, in some embodiments the client may make various networking decisions such as IP address assignment, subnet configuration and/or enforcement of security rules regarding incoming and outgoing traffic independently of the corresponding decisions made with respect to other IVNs. For example, a particular private IP address which is assigned to a VM 1160B at VH 1152A of IVN 1120A may also happen be assigned to VM 1160T at VH 1152L of IVN 1120C. Thus, in at least some embodiments, with respect to many aspects of network management, each IVN may effectively be treated by the corresponding client as a standalone network such as one which may be established at the client's private data center. Each IVN may have an associated set of networking metadata 1170 in the depicted embodiment, such as 1170A for IVN 1120A, 1170B for IVN 1120B, and 1170C for IVN 1120C. IVNs may also be referred to as virtual private clouds in some embodiments.

In the embodiment depicted in FIG. 11, a network function virtualization service (NFVS) 1102, with functionality and capabilities similar to NFVS 102 of FIG. 1, may be implemented at least in part for traffic originating at or directed to the virtual machines 1160. The networking metadata 1170 of an IVN may include addresses for the action implementation nodes of NFVS 1102 for various packet processing requirements associated with the IVN in the depicted embodiment. For example, if source address substitution is to be implemented for packets originating at VMs of IVN 1120A, in some embodiments a gateway for outbound traffic may be configured at IVN 1120A specifically for those packets. The metadata 1170A may include an indication of one or more IP addresses assigned to the gateway, which may be mapped to one or more action implementation nodes of NFVS 1102, e.g., using virtual network interfaces. Similarly, the IVN networking metadata may include indications of the interfaces and/or addresses of the NFVS which are to be used for other types of packet processing applications, including multicast, anycast and the like in different embodiments.

Some types of packet processing may be required for traffic originating and terminating within a given IVN in the depicted embodiment, such as packet groups PG1 which comprises packets flowing between different VMs of IVN 1120A (e.g., 1160A and 1160C). Packet groups may also be referred to as flow sets in some embodiments. Other types of transformations may be implemented with respect to packet groups originating at external networks 1150 and destined for VMs such as 1160B within one or more IVNs as indicated by the arrow labeled PG2 (packet group 2). For example, an application may be implemented at VM 1160B, and client requests directed to that application may originate at various devices on the public Internet and/or client-owned external networks 1151A or 1151B. Response to such requests may travel in the opposite direction—e.g., from VM 1160B to the external network. Request packets as well as response packets may pass through the NFVS 1102 in the depicted embodiment for packet groups PG2. In at least some embodiments, a fleet of VCS edge devices 1130 may be used as intermediaries between the VCS and other services or external networks 1150. The VCS edge devices may be responsible for implementing an encapsulation protocol used at the VCS in some embodiments, e.g., for directing packets addressed to a particular VM 1160 to a NIC (network interface card) associated with a virtualization manager at the VM's virtualization host.

In some embodiments the NFVS 1102 may be used as a scalable and secure channel for traffic between IVNs. For example packet group PG3 may comprise packets transmitted between IVNs 1120A and 1120B of the same client C1 via NFVS 1102, while packet group PG4 may comprise packets transmitted between the IVNs of two different clients (IVN 1120B of client C1 and IVN 1120C of client C2) in the depicted embodiment. In some embodiments in which the NFVS 1102 is to serve as a conduit between two different clients' IVNs, both clients may have to approve the establishment of connectivity before the NFVS starts processing the cross-IVN packets. The NFVS 1102 may also be used for processing packet flows between different services of the provider network in some embodiments. For example, packet groups PG5 and PG6 between IVNs of the VCS and other services such as database service 1144 or storage service 1140 may be processed at NFVS 1102 in the depicted embodiment. In at least one embodiment, the NFVS 1102 may be used to process packets directed from one external network to another—e.g., packet group PG7, comprising packets flowing between client C1's first external network 1151A and second external network 1151B, may be processed using the NFVS 1151A. It is noted that not all the VMs of the VCS may be assigned to clients of the VCS; some VMs may be used for internal purposes in various embodiments. In at least one embodiment, as mentioned earlier, some VMs may be used for the nodes at one or more layers of the NFVS. In some embodiments, the NFVS may not necessarily be employed for one or more of the kinds of traffic flows illustrated in FIG. 11.

Control Plane Operations Using Communicating Administration Master Nodes

Figure 12:
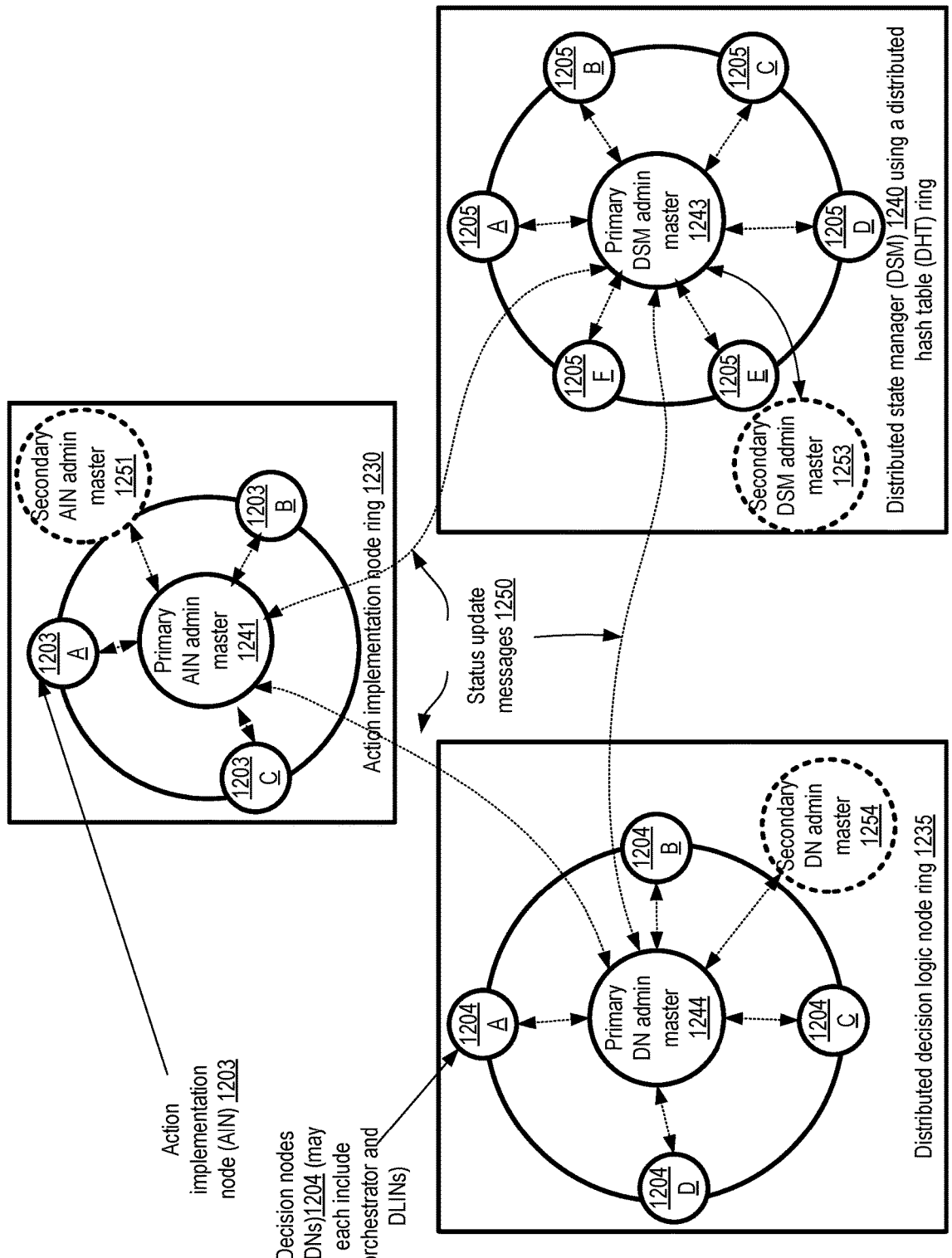
FIG. 12 illustrates an example of the use of communicating administration master nodes for control-plane operations at a network function virtualization service, according to at least some embodiments.

FIG. 12 illustrates an example of the use of communicating administration master nodes for control-plane operations at a network function virtualization service, according to at least some embodiments. As discussed earlier, a distributed state manager of a decision making cell (e.g., similar to cells 142 shown in FIG. 1) may be implemented using a plurality of nodes organized as a ring (similar to the distributed hash table rings shown in FIG. 6 and FIG. 7). In the embodiment depicted in FIG. 12, in addition to one or more distributed state manager (DSM) rings 1240, the network function visualization service may also comprise one or more action implementation node rings 1230 and distributed decision logic rings 1235. The DSM ring 1240 in the depicted embodiment may comprise, for example, a set of distributed hash table (DHT) nodes 1205, such as 1205A-1205F, similar in functionality to the nodes 605 of FIG. 6 and nodes 705 of FIG. 7. The workload associated with storage and retrieval of state information, e.g., including representations of actions to be taken for various packet groups or flows being processed using a given decision making cell, may be distributed among the nodes 1205 as discussed earlier. At a given point in time, the DSM ring 1240 may comprise at least two administration master nodes in the depicted embodiment: one currently designated as a primary administration master 1243 and another designated a secondary administration master node 1253. In some embodiments, the primary administration master 1243 may be referred to as the active administration master, while the secondary administration master 1253 may be referred as a passive administration master. Both primary and secondary administration master nodes 1243 and 1253 may be responsible in some embodiments for receiving metrics and status information from the various hash table nodes 1205, monitoring the health status of the nodes 1205, and/or for other administrative tasks. In one embodiment, the primary administration master node 1243 and/or the secondary administration master node 1253 may make configuration change decisions (e.g., adding/removing nodes, thereby redistributing the workload) with respect to the ring 1240, but only the primary administration master may publish or push the configuration changes to other parts of the NFV service and/or its clients. In other embodiments, only the primary administration master node may make configuration change decisions. The roles of primary and secondary administration masters may be transferred as needed—e.g., in the event of a failure at the primary, the secondary may be named the primary administration master in some embodiments.

In addition to communicating with, and monitoring, the DHT nodes 1205, in the depicted embodiment the administration master nodes 1243 and 1253 may also monitor each other and nodes of the action implementation layer and/or other nodes of the decision making layer of the NFV service. One or more decision making cells of the service may also be organized as a distributed decision making ring 1235 in some embodiments, comprising a set of decision nodes 1204 (e.g., 1204A, 1204B, 1204C and 1204D), a primary decision node administration master 1244 and a secondary decision node administration master 1254. A given decision node 1204 may, for example, include a logic pipeline orchestrator and one or more decision logic implementation nodes in the depicted embodiment. The primary DN administration master 1244 may be responsible for monitoring the health of the decision nodes 1204, making configuration changes as needed, and communicating with other administration master nodes such as primary and/or secondary DSM administration master nodes in the depicted embodiment to provide updated information about the DN nodes 1204. The secondary DN administration master 1254 may operate passively in some embodiments, e.g., receiving health status information but not initiating configuration changes, in a manner analogous to the DSM secondary administration master.

The action implementation layer may also comprise some number of action implementation nodes 1203 (e.g., 1203A-1203C) arranged in logical rings such as ring 1230 in the depicted embodiment, with a primary administration master node 1241 and a secondary administration master node 1251. The primary administration master node may collect metrics, status and/or health information from the AINs 1203, make configuration changes at the action implementation layer as needed and communicate with other primary administration masters such as primary DSM administration master 1243 and primary DN administration master 1244 in some embodiments. In one embodiment, status update messages 1250 exchanged (e.g., periodically) among the administration master nodes may include summarized metrics and health information for all the nodes in the respective rings; in other embodiments, only changes or deltas since the last message may be transmitted. In some embodiments, a secondary administration master may not be configured, e.g., for DN rings, AIN rings and/or for DSM rings. Note that, as shown, the configuration (e.g. node counts) of the rings at the different layers, or even in different cells of the same layer, may not be identical—e.g., the number of nodes may differ, the number of administration master nodes may differ, and so on. While nodes (e.g., AINs, DNs or DHT nodes) are being added or removed at one or more rings, in some embodiments their respective administration masters (e.g., the primary administration masters) may be responsible for ensuring that traffic does not hit newly created/terminated nodes until all necessary configuration steps have been completed, e.g., by publishing a temporary configuration file indicating which nodes are available to receive requests. After all the configuration steps have been successfully completed, the administration masters may receive a signal that provisioning/configuration is complete, and in some embodiments may publish the final configuration to the components, allowing normal operations to resume using the entire new configuration. In some embodiments, administration masters of the kind discussed in the context of FIG. 12 may be implemented as part of a separate control plane service than the NFVS.

Methods for Implementing a Scalable NFVS

Figure 13:
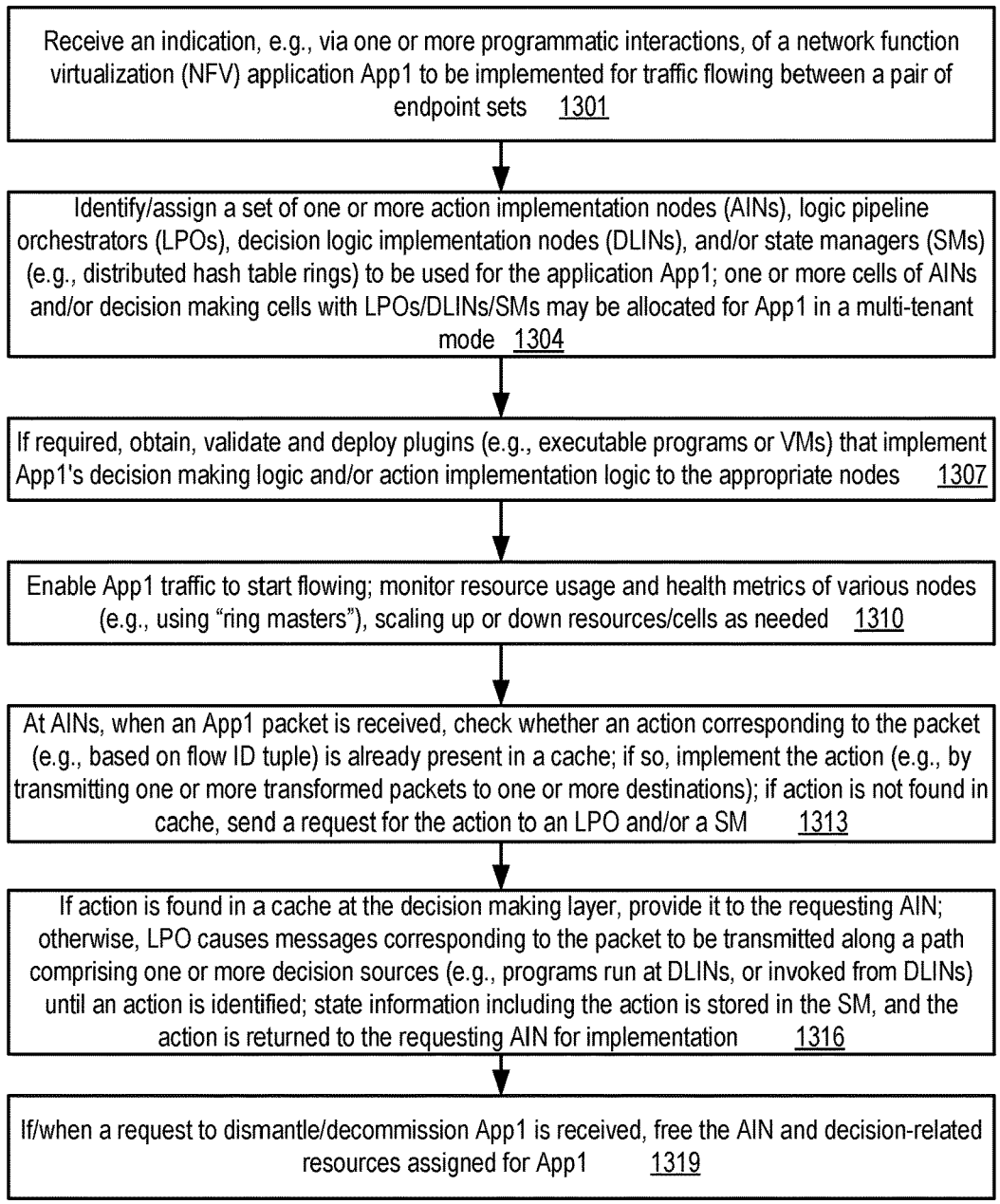
FIG. 13 is a flow diagram illustrating aspects of operations that may be performed to implement scalable network function virtualization, according to at least some embodiments.

FIG. 13 is a flow diagram illustrating aspects of operations that may be performed to implement scalable network function virtualization, according to at least some embodiments. As shown in element 1301, an indication of a network function virtualization application App1 comprising packet processing actions of one or more types to be implemented for traffic flowing between a pair of endpoint sets may be received, e.g., via a programmatic interface at a control plane or administrative component of a network function virtualization service (NFVS) in the depicted embodiment. A wide variety of application types may be supported using network function virtualization in different embodiments, such as load balancing, source address substitution, multicast, anycast, scalable VPN, scalable cross-isolated-virtual-network channels, and so on.

In various embodiments, the control plane component may identify and assign a collection of resources, including one or more action implementation nodes (AINs), logic pipeline orchestrators (LPOs), decision logic implementation nodes (DLINs), and/or state managers (SMs) (e.g., distributed hash table rings) to be used for the application App1 (element 1304). In some embodiments in which a cell-based layered architecture similar to that shown in FIG. 1 is employed, one or more cells of AINs and/or decision making cells with LPOs/DLINs/SMs may be allocated for App1. In at least one such embodiment, individual ones of the cells may be configured in a multi-tenant mode—e.g., a given cell and/or a give node may be designate for use on behalf of multiple applications and/or multiple clients of the NFVS. In other embodiments, at least some cells, or some nodes within specific cells, may be utilized in single-tenant mode, e.g., on behalf of a single client or a single application of a single client. In some embodiments, clients may provide indications of their tenancy-related preferences in requests submitted programmatically to the NFVS.

In at least one embodiment, as indicated earlier, clients of the NFVS may provide custom plugins such as executable programs or virtual machine images, for one or more layers of the NFVS, e.g., for action implementation nodes and/or the decision logic implementation nodes. If such custom plugins/programs/virtual machines are to be used for App1, they may be obtained, validated and deployed to the appropriate hardware/software platforms of the NFVS in the depicted embodiment (element 1307). In some embodiments, a client may provide plugins as part of the request to set up App1; in other embodiments, plugins may be provided in a separate programmatic interaction after the request to set up App1 has been accepted. In various embodiments, the NFVS may perform a thorough validation/verification of the client-provided programs/plugins or virtual machines, e.g., to ensure that the operations performed using the client-provided code do not result in undesired side effects such as interference with other applications, violations of resource usage policies, and so on.

The flow of packets of traffic associated with App1 may be enabled in the depicted embodiment (element 1310). Resource usage and health metrics of the various nodes designated for App1 may be monitored, e.g., with the help of administration master nodes of the kind discussed earlier in some embodiments. The number of nodes associated with App1 may be automatically scaled up or down as needed, e.g., based on the metrics collected and/or based on programmatic requests indicating future changes in workload submitted by the clients on whose behalf App1 was set up.

At a given AIN, as indicated in element 1313, when a packet associated with App1 is received, a determination may be made as to whether a processing action corresponding to that packet (and/or a group of related packets, such as a network flow identified using flow identifier elements similar to those shown in FIG. 3) is already present in an AIN cache. If such an action is present in the cache, it may be implemented, resulting for example in the transmission of one or more transformed versions of the incoming packet to one or more destinations in various embodiments. If the action is not found in the cache, a request for the action (which may include a representation of at least a portion of the received packet, or the entire packet) may be transmitted to a decisions layer of the NFVS in the depicted embodiment, e.g., to a logic pipeline orchestrator (LPO) or state manager (SM).

Upon receiving the request for the action, in some embodiments the LPO or state manager may examine a local cache of the decision making layer to determine whether an action for the flow or group of packets is present in the cache. If an appropriate action matching the request is found in the cache, a representation of the action may be transmitted back to the requesting AIN in the depicted embodiment (element 1316). Otherwise, the LPO may cause messages corresponding to the packet that led to the action request to be transmitted along a path that includes one or more decision logic implementation nodes (DLINs) until an action is identified in the depicted embodiment. The specific path or sequence of DLINs to be used for a particular application may be indicated by a client of the NFVS in some embodiments, e.g., by supplying a pipeline descriptor formatted in a markup or scripting language. The action may include any combination of a wide variety of operations, such as a load balancing operation, an address translation operation, an anycast operation, a source address substitution operation, a packet replication operation, etc. in various embodiments. At a given DLIN, one or more decision sources (e.g., programs/processes run locally at the DLIN, or invoked from an external network-accessible resource or endpoint) may be used to implement a portion of the decision making logic of the application to identify/generate a representation of the action. In at least some embodiments, as indicated earlier, at least a portion of the decision making logic may have been provided, selected (e.g., from a catalog) or indicated by the NFVS client via a programmatic interface. In some embodiments, as part of the action, one or more header elements of the received packet (the packet whose arrival at the AIN led to the action) may be transformed to generate one or more outbound packets. In other embodiments, a portion of the data payload or body portion of the packet may be extracted, analyzed and/or modified as part of the action. State information pertaining to the group of packets for which the action is identified, including in some cases a representation of the action itself, may be stored at the state manager (e.g., at multiple nodes of a distributed hash table), and an indication of the action may be returned to the requesting AIN. The requesting AIN may then implement the action in some embodiments. In other embodiments, the action for the first packet of a group of related packets may be implemented at the decisions layer itself, and the indication of the action may be sent to the action implementation layer for caching and execution for subsequent packets of the group (if any). If/when a request to dismantle or decommission the application App1 is received at the NFVS, the AINs and decision-related resources that were assigned for App1 may be freed in at least some embodiments.

It is noted that in various embodiments, some of the operations shown in FIG. 13 may be implemented in a different order than that shown in the figure, or may be performed in parallel rather than sequentially. Additionally, some of the operations shown in FIG. 13 may not be required in one or more implementations.

Use Cases

The techniques described above, of provisioning a scalable multi-layer network function virtualization service to which clients may provide customized packet processing logic, may be useful in a variety of scenarios. As more and more distributed applications are migrated to provider network environments, the need for efficient and fault-tolerant management of packet transformation operations is also increasing. The clean separation of function between a fast action implementation layer and a decision making layer, each of which may be implemented using replicable units or cells that can be quickly brought online, may simplify the rollout of new functionality or additional nodes at the various layers without affecting the work being done at the other layers. The use of a distributed state manager, e.g., including dynamically expandable rings of distributed hash table, may also help with the service adapt to changing workloads.

Illustrative Computer System

Figure 14:
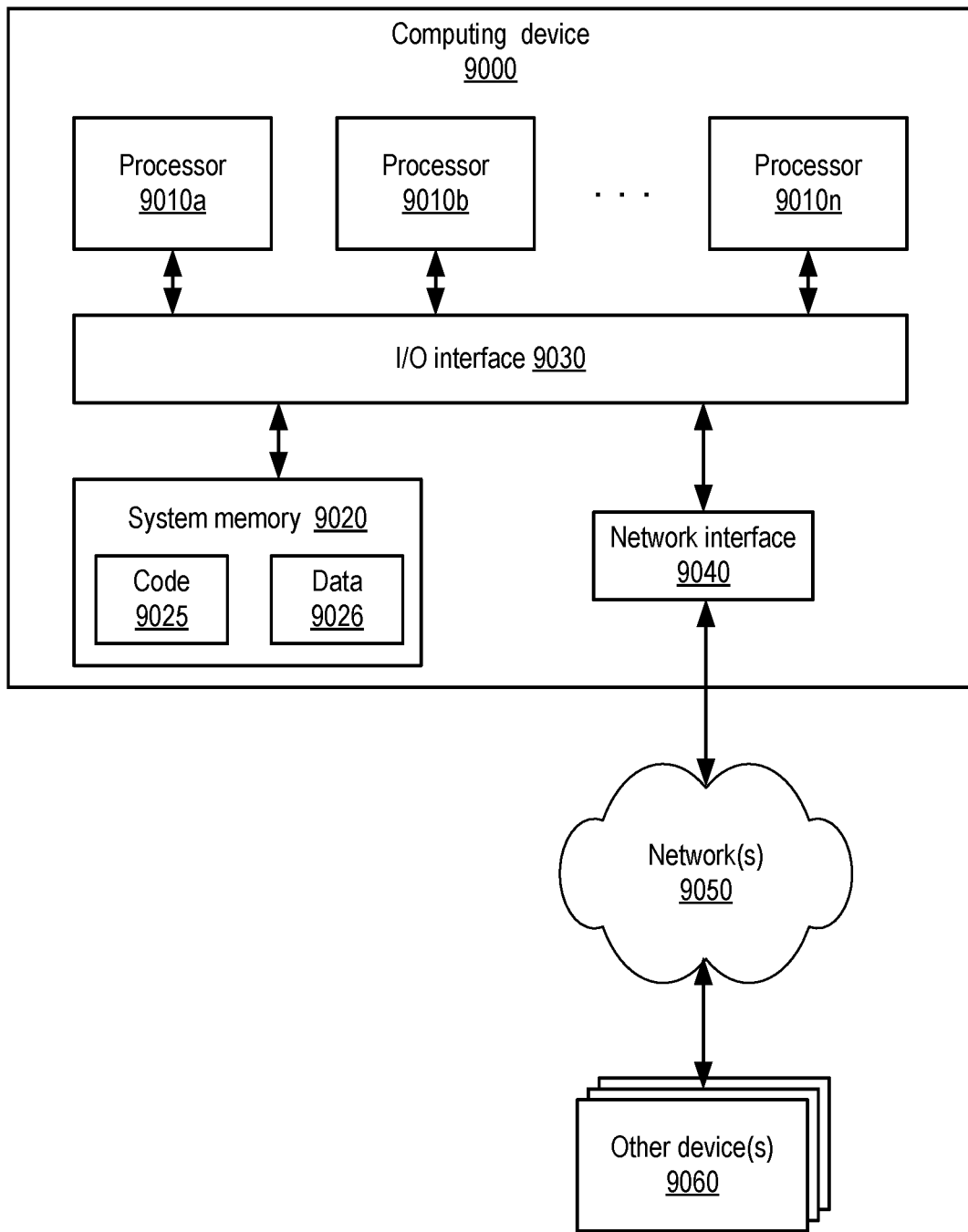
FIG. 14 is a block diagram illustrating an example computing device that may be used in at least some embodiments.

In at least some embodiments, a server that implements one or more of the control-plane and data-plane components that are used to support network function virtualization and packet processing techniques described herein may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   deploying, on or across a plurality of virtual machines hosted by one or more hosts comprising a plurality of resources including one or more processors and corresponding memory, logic implementing respective first and second virtualized network functions of a first application, the respective first and second virtualized network functions individually configured to perform respective functionality for a message to be transmitted;
   causing, by an orchestrator, based at least in part on output of at least the first virtualized network function of the first application, input to be obtained at the second virtualized network function of the first application, wherein the output of at least one of the first and second virtualized network functions is for the message to be transmitted; and
   transmitting the message to a destination associated with the first application, the message generated based at least in part on the functionality performed by the first virtualized network function, and generated based at least in part on the functionality performed by the second virtualized network function.

2. The computer-implemented method as recited in claim 1, further comprising:
   deploying a virtualized network function of a second application at a particular resource of the plurality of resources, wherein logic implementing a virtualized function of the first application is also deployed at the particular resource; and
   transmitting, to a destination associated with the second application, a message processed at the particular resource using the virtualized network function of the second application.

3. The computer-implemented method as recited in claim 2, further comprising:
   determining, based at least in part on input received via a programmatic interface, that the particular resource is to be configured in single-tenant mode.

4. The computer-implemented method as recited in claim 1, further comprising:
   configuring a particular resource of the plurality of resources in single-tenant mode, such that the particular resource is utilized for no more than one application.

5. The computer-implemented method as recited in claim 1, further comprising:
   based at least in part on one or more metrics collected from the plurality of resources, scaling up the first application, wherein the scaling up comprises deploying at least one of the respective virtualized network functions of the first application to an additional resource.

6. The computer-implemented method as recited in claim 1, further comprising:
   obtaining a request, via a programmatic interface, for metrics associated with at least the first virtualized network function of the first application; and
   presenting, in response to the request for metrics, one or more metrics collected with respect to the first virtualized network function.

7. The computer-implemented method as recited in claim 1, further comprising:
   obtaining a request, via a programmatic interface, to modify a configuration of at least the first virtualized network function of the first application; and
   changing, in response to the request to modify the configuration, a set of resources used to implement the first virtualized network function.

8. A system, comprising:
   one or more computing devices comprising memory;
   wherein the memory of the one or more computing devices stores instructions that upon execution on or across the one or more computing devices cause the one or more computing devices to:
      deploy, on or across a plurality of virtual machines hosted by one or more hosts comprising a plurality of resources including one or more processors and corresponding memory, logic implementing respective first and second virtualized network functions of a first application, the respective first and a second virtualized network functions individually configured to perform respective functionality for a message to be transmitted;
      cause, based at least in part on output of at least the first virtualized network function of the first application, input to be obtained at the second virtualized network function of the first application, wherein the output of at least one of the first and second virtualized network functions is for the message to be transmitted; and
      transmit the message to a destination associated with the first application, the message generated based at least in part on the functionality performed by the first virtualized network function, and generated based at least in part the functionality performed by the second virtualized network function.

9. The system as recited in claim 8, wherein the one or more computing devices include further instructions that upon execution on or across the one or more computing devices:
   deploy a virtualized network function of a second application at a particular resource of the plurality of resources, wherein logic implementing a virtualized function of the first application is also deployed at the particular resource; and
   transmit, to a destination associated with the second application, a message processed at the particular resource using the virtualized network function of the second application.

10. The system as recited in claim 8, wherein the one or more computing devices include further instructions that upon execution on or across the one or more computing devices:
   configure a particular resource of the plurality of resources in single-tenant mode, such that the particular resource is utilized for no more than one application.

11. The system as recited in claim 10, wherein the one or more computing devices include further instructions that upon execution on or across the one or more computing devices:
    determine, based at least in part on input received via a programmatic interface, that the particular resource is to be configured in single-tenant mode.

12. The system as recited in claim 8, wherein the one or more computing devices include further instructions that that upon execution on or across the one or more computing devices:
    based at least in part on one or more metrics collected from the plurality of resources, scale up the first application by deploying at least one of the respective virtualized network functions of the first application to an additional resource.

13. The system as recited in claim 8, wherein the one or more computing devices include further instructions that that upon execution on or across the one or more computing devices:
    obtain a request, via a programmatic interface, for metrics associated with at least the first virtualized network function of the first application; and
    present, in response to the request for metrics, one or more metrics collected with respect to the first virtualized network function.

14. The system as recited in claim 8, wherein the one or more computing devices include further instructions that upon execution on or across the one or more computing devices:
    obtain a request, via a programmatic interface, to modify a configuration of at least the first virtualized network function of the first application; and
    change, in response to the request to modify the configuration, a set of resources used to implement the first virtualized network function.

15. One or more non-transitory computer-accessible storage media storing program instructions that when executed on or across one or more processors:
    deploy, on or across a plurality of virtual machines hosted by one or more hosts comprising a plurality of resources including one or more processors and corresponding memory, logic implementing respective first and second virtualized network functions of a first application, the respective first and second virtualized network functions individually configured to perform respective functionality for a message to be transmitted;
    cause, based at least in part on output of at least the first virtualized network function of the first application, input to be obtained at the second virtualized network function of the first application, wherein the output of at least one of the first and second virtualized network functions is for the message to be transmitted; and
    transmit the message to a destination associated with the first application, the message generated based at least in part on the functionality performed by the first virtualized network function, and generated based at least in part on the functionality performed by the second virtualized network function.

16. The one or more non-transitory computer-accessible storage media as recited in claim 15, storing further program instructions that when executed on or across one or more processors:
    deploy a virtualized network function of a second application at a particular resource of the plurality of resources, wherein logic implementing a virtualized function of the first application is also deployed at the particular resource; and
    transmit, to a destination associated with the second application, a message processed at the particular resource using the virtualized network function of the second application.

17. The one or more non-transitory computer-accessible storage media as recited in claim 15, storing further program instructions that when executed on or across one or more processors:
    configure a particular resource of the plurality of resources in single-tenant mode, such that the particular resource is utilized for no more than one application.

18. The one or more non-transitory computer-accessible storage media as recited in claim 17, storing further program instructions that when executed on or across one or more processors:
    determine, based at least in part on input received via a programmatic interface, that the particular resource is to be configured in single-tenant mode.

19. The one or more non-transitory computer-accessible storage media as recited in claim 15, storing further program instructions that when executed on or across the one or more processors:
    based at least in part on one or more metrics collected from the plurality of resources, scale up the first application by deploying at least one of the respective virtualized network functions of the first application to an additional resource.

20. The one or more non-transitory computer-accessible storage media as recited in claim 15, storing further program instructions that when executed on or across the one or more processors:
    obtain a request, via a programmatic interface, to modify a configuration of at least the first virtualized network function of the first application; and
    change, in response to the request to modify the configuration, a set of resources used to implement the first virtualized network function.

* * * * *